(12) United States Patent
Baldwin et al.

(10) Patent No.: US 10,694,348 B2
(45) Date of Patent: **\*Jun. 23, 2020**

(54) FACILITATING MESH NETWORKS OF CONNECTED MOVABLE OBJECTS

(71) Applicant: AT&T Intellectual Property I, L.P., Atlanta, GA (US)

(72) Inventors: Christopher Baldwin, Algonquin, IL (US); Nikhil S Marathe, Roselle, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,029

(22) Filed: May 24, 2019

(65) Prior Publication Data
US 2019/0289429 A1 Sep. 19, 2019

Related U.S. Application Data

(63) Continuation of application No. 15/588,838, filed on May 8, 2017, now Pat. No. 10,334,404, which is a
(Continued)

(51) Int. Cl.
*H04W 4/40* (2018.01)
*H04W 4/029* (2018.01)
(Continued)

(52) U.S. Cl.
CPC ............ *H04W 4/40* (2018.02); *H04W 4/027* (2013.01); *H04W 4/029* (2018.02);
(Continued)

(58) Field of Classification Search
CPC ... H04W 4/40; H04W 4/027; H04W 28/0226; H04W 40/026; H04W 4/029; H04W 84/005
See application file for complete search history.

(56) References Cited

U.S. PATENT DOCUMENTS

| 5,355,506 A | 10/1994 | Mariani |
| 5,448,479 A | 9/1995 | Kemner et al. |

(Continued)

FOREIGN PATENT DOCUMENTS

| AU | 2011239326 A1 | 11/2011 |
| AU | 2011205103 A1 | 4/2012 |

(Continued)

OTHER PUBLICATIONS

Alshaer, et al., "An optimized adaptive broadcast scheme for intervehicle communication," Vehicular Technology Conference, Spring 2005, IEEE 61st. vol. 5, 5 pages.
(Continued)

*Primary Examiner* — Christine Ng
(74) *Attorney, Agent, or Firm* — Amin, Turocy & Watson, LLP

(57) ABSTRACT

Wireless communication via a mesh network of connected movable objects is described. A method includes determining, by a device including a processor, a value of a characteristic of a first movable object of movable objects communicatively coupled to a wireless network, wherein the movable objects are automated vehicles, and wherein the determining the value is based on a likelihood of receipt of a message transmitted from the first movable object to a second movable object of the movable objects. The method also includes generating information usable to move the first movable object in a manner that satisfies a defined condition associated with the value. The information can be strength of a wireless communication channel between the first movable object and a second movable object of the movable objects.

20 Claims, 19 Drawing Sheets

Related U.S. Application Data continuation of application No. 14/259,560, filed on Apr. 23, 2014, now Pat. No. 9,681,272.

(51) Int. Cl.
    *H04W 4/02*     (2018.01)
    *H04W 28/02*     (2009.01)
    *H04W 40/02*     (2009.01)
    *H04W 28/08*     (2009.01)
    *H04W 84/00*     (2009.01)
    *H04W 84/18*     (2009.01)
    *H04W 88/08*     (2009.01)

(52) U.S. Cl.
    CPC ..... *H04W 28/0226* (2013.01); *H04W 40/026* (2013.01); *H04W 28/08* (2013.01); *H04W 84/005* (2013.01); *H04W 84/18* (2013.01); *H04W 88/08* (2013.01)

(56) References Cited

U.S. PATENT DOCUMENTS

| | | | |
|---|---|---|---|
| 5,794,128 A * | 8/1998 | Brockel | H04B 17/3912 455/506 |
| 5,889,475 A * | 3/1999 | Klosinski | G08G 1/087 340/902 |
| 6,408,226 B1 | 6/2002 | Byrne et al. | |
| 6,484,032 B1 * | 11/2002 | Okada | H04W 36/32 455/436 |
| 6,523,629 B1 | 2/2003 | Buttz et al. | |
| 6,687,571 B1 | 2/2004 | Byrne et al. | |
| 7,099,774 B2 * | 8/2006 | King | G01C 21/26 340/426.16 |
| 7,609,156 B2 | 10/2009 | Mullen | |
| 7,979,173 B2 | 7/2011 | Breed | |
| 8,058,990 B2 | 11/2011 | Mullen | |
| 8,280,623 B2 | 10/2012 | Trepagnier et al. | |
| 8,352,112 B2 | 1/2013 | Mudalige | |
| 8,395,499 B2 | 3/2013 | Mullen | |
| 8,412,449 B2 | 4/2013 | Trepagnier et al. | |
| 8,473,140 B2 | 6/2013 | Norris et al. | |
| 8,532,862 B2 | 9/2013 | Neff | |
| 9,681,272 B2 * | 6/2017 | Baldwin | H04W 4/029 |
| 2003/0221118 A1 | 11/2003 | Walker | |
| 2005/0093717 A1 * | 5/2005 | Lilja | G08G 1/0965 340/902 |
| 2006/0004500 A1 * | 1/2006 | Lefaure | B60C 23/0416 701/33.4 |
| 2006/0209828 A1 * | 9/2006 | Ng | H04L 63/04 370/392 |
| 2009/0287408 A1 * | 11/2009 | Gerdes | G01C 21/3423 701/533 |
| 2010/0044998 A1 | 2/2010 | Franchineau | |
| 2011/0106362 A1 | 5/2011 | Seitz | |
| 2011/0282566 A1 * | 11/2011 | Kawauchi | G08G 1/161 701/117 |
| 2013/0274986 A1 | 10/2013 | Trepagnier et al. | |
| 2013/0289858 A1 | 10/2013 | Manigat et al. | |
| 2013/0344803 A1 * | 12/2013 | Isu | H04W 36/32 455/39 |

FOREIGN PATENT DOCUMENTS

| | | |
|---|---|---|
| EP | 2021227 B1 | 2/2009 |
| EP | 2645196 A1 | 10/2013 |
| GB | 2421828 A | 7/2006 |
| WO | 2007048003 A2 | 4/2007 |

OTHER PUBLICATIONS

Chen, et al., "Ad hoc peer-to-peer network architecture for vehicle safety communications." Communications Magazine, IEEE 43.4, 2005: 100-107, 8 pages.

Sichitiu, et al., "Inter-vehicle communication systems: a survey," Communications Surveys & Tutorials, IEEE 10.2, 2008: 88-105, 18 pages.

Estrin, et al., "Next century challenges: Scalable coordination in sensor networks." Proceedings of the 5th annual ACM/IEEE international conference on Mobile computing and networking, 1999, 8 pages.

Office Action for U.S. Appl. No. 14/259,560 dated Sep. 23, 2016, 30 pages.

Office Action for U.S. Appl. No. 14/259,560 dated Jun. 14, 2016, 30 pages.

Office Action for U.S. Appl. No. 14/259,560 dated Feb. 29, 2016, 44 pages.

Office Action dated Oct. 5, 2018 for U.S. Appl. No. 15/588,838, 37 pages.

Notice of Allowance dated Feb. 11, 2019 for U.S. Appl. No. 15/588,838, 31 pages.

* cited by examiner

FACILITATING MESH NETWORKS OF CONNECTED MOVABLE OBJECTS

RELATED APPLICATION

The subject application is a continuation of, and claims priority to each of, U.S. patent application Ser. No. 15/588,838 (now U.S. Pat. No. 10,334,404), filed May 8, 2017, and entitled "FACILITATING MESH NETWORKS OF CONNECTED MOVABLE OBJECTS," which is a continuation of U.S. patent application Ser. No. 14/259,560 (now U.S. Pat. No. 9,681,272), filed Apr. 23, 2014, and entitled "FACILITATING MESH NETWORKS OF CONNECTED MOVABLE OBJECTS," the entirety of which application is hereby incorporated by reference herein.

TECHNICAL FIELD

The subject disclosure relates generally to wireless communications, e.g., wireless communications via mesh networks (MNs) of connected movable objects.

DETAILED DESCRIPTION

Figure 1:
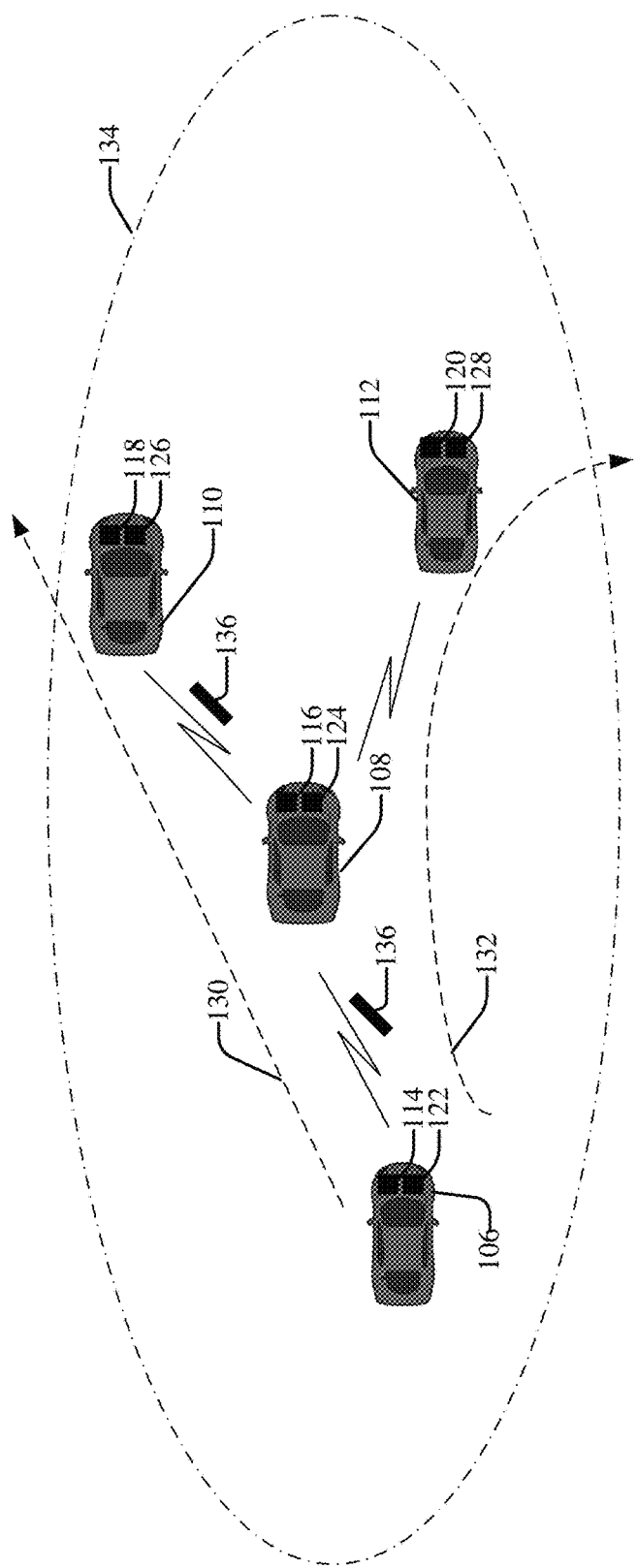
FIG. 1 illustrates an example block diagram of a system facilitating wireless communication via a MN of connected movable objects in an environment in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "movable object," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

Traditionally cars have served the single purpose of the transportation of people and goods. The replacement of traditional cars by connected cars facilitates functionality beyond mere transportation. Conventional cruise control systems for traditional cars tend to merely allow a driver to control the speed of a car while including a safety feature of disengaging cruise control is the system detects depression of the brake pedal. These limited functions provide for a wide range of opportunity for automated vehicles, including wireless communication of information between movable objects.

Embodiments described herein include systems, methods, apparatus and/or computer-readable storage media that facilitate wireless communications via MNs of connected movable objects. In various embodiments, the movable objects can include, but are not limited to, connected cars, trains, buses or emergency vehicles. In various embodiments, any number of different movable objects for which movement and/or location can be controlled to facilitate the transfer of wireless communication information between the movable objects can be employed.

In one embodiment, a method includes determining, by a device including a processor, a value of a characteristic of a first movable object of movable objects communicatively coupled to a wireless network, wherein the movable objects are automated vehicles, and wherein the determining the value is based on a likelihood of receipt of a message transmitted from the first movable object to a second movable object of the movable objects. The method also includes generating, by the device, information usable to move the first movable object in a manner that satisfies a defined condition associated with the value.

In another embodiment, another method includes: determining, by a device including a processor, a characteristic associated with a wireless channel for movable objects, wherein the wireless channel is configured to communicate data between the movable objects; and determining, by the device, mobility information about a first movable object of the movable objects based on the determining the characteristic of the wireless channel for the movable objects.

In another embodiment, a computer-readable storage medium is provided. The computer-readable storage medium stores computer-executable instructions that, when executed by a processor of a device, causes the device to perform operations. The operations include: determining a first value of a first characteristic of a first movable object of movable objects communicatively coupled to a wireless network, wherein the determining is based on likelihood of transmission of content from the first movable object to a second movable object of the movable objects satisfying a defined condition. The operations also include generating information usable to cause the first movable object to have a defined mobility, wherein the information is based on the first value.

One or more embodiments described herein can advantageously provide wireless communication transfer of information between one or more movable objects based on one or more factors/methods/analyses associated with the expected/estimated interference or power of the signals transmitting information between the movable objects, the terrain, time of day (and corresponding amount of interference expected/estimated for signals transmitting information between the movable objects), an importance/sensitivity of communication (and corresponding need to ensure that information is transmitted/received accurately) or the like. In various embodiments, the velocity of one or more of the movable objects can also be employed as a factor in determining movement of one or more movable object, the one or more other movable objects to which to wirelessly transfer information, whether to establish a new communication path/channel between one or more movable objects or the like. As used herein, the term "velocity" means the speed and direction of travel of a movable object.

One or more embodiment described herein can optimize or improve the quality and/or characteristics of the channels in a MN such that wireless communication channel bottlenecks can be reduced or eliminated (and latency of communicated information flowing through the communication path of movable objects in the MN can be therefore reduced and information flow improved). One or more embodiments can determine whether to establish multiple or redundant paths of communication between movable objects to provide increased reliability of communications.

One or more embodiments can advantageously provide the MN and system at low-cost given that the system can largely employ sensors in connected movable objects and computing systems for implementing the MN device at the movable object can be integrated into existing hardware and software or added for little additional cost.

One or more embodiments can also increase the likelihood of maintaining safe driving distance between movable objects. The embodiments of the MN device described herein can also provide conventional automated vehicles a second check on various systems that can allow detection whether there is a failure of camera, sensor, etc.

Turning now to the drawings, FIG. 1 illustrates an example block diagram of a system facilitating wireless communication via a MN of connected movable objects in an environment in accordance with one or more embodiments described herein. System 100 can include movable objects 106, 108, 110, 112, MN devices 114, 116, 118, 120 and/or location and movement components 122, 124, 126, 128. In various embodiments, one or more of movable objects 106, 108, 110, 112 can be communicatively coupled to one another forming a first channel/communication path 130 or a second channel/communication path 132 based on information generated by one or more of respective MN devices 114, 116, 118, 120 configured to control the movement and/or location of movable objects such that one or more of first channel/communication path 130 and/or second channel/communication path can be established and/or the quality of the signals communicated between movable objects 106, 108, 110, 112 (and corresponding communication reliability) can be improved. In the embodiments described herein, first channel/communication path 130 and/or second channel/communication path 132 can be unidirectional communication paths, passing information in one direction only (e.g., from movable object 106 to movable object 108), or bi-directional communication paths, passing information in two directions (e.g., from movable object 108 to movable object 106 or from movable object 106 to movable object 108).

In the embodiments described herein, movable objects 106, 108, 110, 112 can store, transmit and/or receive a wide range of different types of information. The information can include, but is not limited to, still images, text, video, audio, social media information, personal data associated with movable objects 106, 108, 110, 112 and/or personal data associated with an owner, driver or occupant of movable object 106, 108, 110, 112. Accordingly, in lieu of merely transmitting navigation information and/or movable object lane change or speed information between movable objects, embodiments described herein can enable transmission and/or receipt of personal information. For example, internet downloads/surfing, social media correspondence or the like can be transmitted over wireless channels made up of a movable object transmitters and/or receivers.

In various embodiments, a communication path can be made up of two or more of movable objects 106, 108, 110, 112. For example, while movable objects 106, 108, 110 are associated with communication path/channel 130, movable objects 106, 108, 112 are associated with communication path/channel 132. From time to time, one or more movable objects can join or leave a communication path and/or communication paths can be activated or de-activated as the need for the communication path changes.

In FIG. 1, movable object 106 receives information 136 and/or transmits information 136 to movable object 108. In some embodiments, movable object 16 can determine that information 136 is intended for a movable object within MN 134 and transmit information 136 to any number of movable objects within MN 134. In some embodiments, the information transmitted to and/or received by a movable object can be intended for the movable object (or the owner or occupant of the movable object) as the final destination. However, in some embodiments, the information received by and/or transmitted to a movable object can be intended for another movable object in MN 134. As such, in this case, the movable object that receives the information can forward the received information along a communication path towards or to the movable object for which the information is intended.

For example, in one embodiment, information intended for movable object 110 can be received by movable object 106 and, in one embodiment, movable object 106 can determine that the next hop movable object in the route to movable object 110 is movable object 108. Accordingly, movable object 106 can transmit to movable object 108 the received information intended for movable object 110. The process can repeat itself at movable object 108 such that movable object 108 transmits the information intended for movable object 110 to movable object 110.

Movable objects 106, 108, 110, 112 can include software, hardware and/or a combination of hardware and software configured to facilitate wireless communications within MNs (e.g., MN 134) via connected movable objects. In some embodiments, movable objects 106, 108, 110, 112 can include any number of different types of objects that are able to move from one location to another location and can be electrically and/or communicatively coupled to a respective one of MN devices 114, 116, 118, 120 to facilitate wireless communications within MN 134 with one or more other movable objects 106, 108, 110, 112. By way of example, but not limitation, movable objects 106, 108, 110, 112 can include connected cars (e.g., personal cars, commercial cars (e.g., Uber service cars), taxicabs and/or buses), connected drones (e.g., connected unmanned aircraft or ships), connected submarines (e.g., autonomous or otherwise) and/or connected devices having wheels or any other structure for transportation, including, but not limited to, non-automated, human-propelled transportation (e.g., movable objects propelled under human or other non-automated force such as ground searches employing movable objects). For example, two or more autonomous submarines can relay information between one another and/or back to a central ship.

Movable objects 106, 108, 110, 112 can include any number of different movable objects that can transmit and/or receive communication to/from another one of movable objects 106, 108, 110, 112. In some embodiments, movable objects 106, 108, 110, 112 can include respective transceivers configured to transmit and/or receive information/content to/from movable objects 106, 108, 110, 112 to other ones of movable objects 106, 108, 110, 112. In doing so, one or more of movable objects 106, 108, 110, 112 form a communication path of objects able to receive and pass information that may be intended for a movable object on the communication path.

Movable objects 106, 108, 110, 112 include and/or are electrically or communicatively coupled to respective MN devices 114, 116, 118, 120. Movable objects 106, 108, 110, 112 (or MN devices 114, 116, 118, 120) can also include and/or are electrically or communicatively coupled to location and movement components 122, 124, 126, 128. Location and movement components 122, 124, 126, 128 can adjust movement of a movable object such that the distance (e.g., horizontal, vertical or otherwise) between two movable objects is adjusted to result in an improved wireless communication channel between the two movable objects.

Movable objects 106, 108, 110, 112 can include location and movement components 122, 124, 126, 128 that can control the movement of movable objects 106, 108, 110, 112. For example, location and movement components 122, 124, 126, 128 can provide intelligent cruise control, lane change, acceleration, deceleration, speed and/or velocity determination functionality for movable objects 106, 108, 110, 112. One example of intelligent cruise control is dynamic adaptation of cruise control settings based on changes in conditions (e.g., distance between two or more of movable objects 106, 108, 110, 112), adherence to safety precautions/recommendations (e.g., reduction of speed in construction zones), self-driving, etc.

In various embodiments, the MN device 114 can facilitate various functions for evaluating MN 134, characteristics of signals transmitted/received over wireless channels between movable objects, characteristics of the terrain or time of day to determine likelihood of interference and corresponding likely signal power and a number of other aspects (current or historical) to generate information for controlling the movement or location of movable object 106 or other movable objects in MN 134 to optimize and/or improve the ability for movable objects within MN 134 to communicate information (e.g., personal data, social media, video, audio, still images) between movable objects in MN 134. In some embodiments, MN device 114 can evaluate current and/or future velocity of movable object 106 and/or one or more other movable objects (e.g., movable objects 108, 110) and/or current and/or future environmental or situational limitations/constraints (whether natural or man-made/arbitrary) within or for the environment in which MN 134 is located to determine whether to move in a desired manner for facilitation of transfer of information between movable objects. Examples of natural limitations/constraints include, but are not limited to, speed of light. Examples of man-made/arbitrary limitations/constraints include, but are not limited to, speed limit, ideal or required distance (horizontal, vertical or otherwise) between movable objects). In one embodiment, if movable object 106 is moving from a zone having a first speed limit (e.g., 55 miles per hour) to a zone having a second speed limit (e.g., 35 miles per hour) in a defined amount of space (e.g., in the next 100 feet of travel of movable object 106), MN device 114 can also generate information based on these factors in determining information for movement of movable object 106 and/or for determining whether to initiate action to form one or more new communication channels, whether to use one communication path/channel versus another communication path/channel or the like. The information generated by MN device 114 can be employed by a location and movement component (e.g., location and movement component 122) that can cause the movable object (e.g., movable object 106) to move in a desired manner as dictated by the information generated by MN device 114.

In some embodiments, each movable object of the MN 134 includes a MN device. The MN device can include one or more sensors capable of identifying the presence or absence of adjacent movable objects and/or the distance between the movable object and another movable object.

For example, in one embodiment, MN device 114 can employ sensor data to determine the relative location and movement of other movable objects, MN device 114 can monitor the characteristics and/or qualities of MN 134 connections to other movable objects, MN device 114 can determine appropriate input to the location and movement component 122, intelligent cruise control and/or self-driving system, and communicate changes and opportunities for movement, speed increase or decrease, acceleration or deceleration to nearby movable objects.

In some embodiments, a MN device 114 can actively monitor the characteristics of the connections to other movable objects and/or the relative movement of nearby movable objects. MN device 114 can utilize this information as well as other data, if available, to maximize the performance of MN 134. Maximizing the performance of MN 134 can be accomplished by identifying wireless connections/channels between movable objects that have low quality, wireless connections/channels between movable objects that have declining quality and/or a lack of wireless connection/channel to one or more other movable objects and providing input to the location and movement control component 122.

In some embodiments, MN device 114 can communicate with one or more other MN devices to inform the one or more other MN devices about an opportunity for a connected movable object with which the one or more other MN devices is associated to change lanes and/or accelerate to establish a new communication path for communication of information (e.g., passing of data between movable objects) thus eliminating or reducing the likelihood of a wireless communication channel bottleneck over a particular communication path/channel. Similarly, as MN devices for other movable objects communicate to nearby movable object planned moves (e.g., lane change), the MN device receiving the information regarding the planned move can take the information into account in strategizing subsequent movements.

As another example, when MN device 114 identifies the presence of a connected movable object, but a connection between movable object 106 and the newly-identified movable object does not exist, MN device 114 can communicate speed and/or lane changes to location and movement component 122 to cause movable object 106 to move within a defined distance of the newly-identified movable object that allows movable object 106 to form a connection with the newly-identified movable object. Similarly when the quality of the connection/channel between movable object 106 and another movable object is low or declining, MN device 114 can take similar actions (e.g., accelerate or decelerate to cause movable object 106 to be closer to the movable object to which movable object 106 is connected) to improve the signal quality.

Movable objects 106, 108, 110, 112 can form a wireless mesh communication network in which one or more of movable objects 106, 108, 110, 112 wirelessly transmit and/or receive information/data to/from movable objects 106, 108, 110, 112 to others of movable objects 106, 108, 110, 112. In various embodiments, a subset of movable objects 106, 108, 110, 112 can form wireless communication channels between others of the set of movable objects 106, 108, 110, 112 from time to time based on various conditions that can change from time to time. For example, if interference is detected at a defined level over a first communication path between movable objects 106, 108, 110, one or more of MN devices 114, 116, 118, 120 can initiate and/or coordinate communication to establish a new communication channel over one or more different movable objects (e.g., second communication channel 132 established over movable objects 106, 108, 112 instead of or in addition to first communication channel 130 established between movable objects 106, 108, 110). The first communication channel can be removed and/or remain in place concurrently with the second communication channel.

Accordingly, the embodiments described herein can provide the MN 134 for personal communication (e.g., transmitting user data not just car velocity, position, etc.). In this regard, the MN 134 can be employed to send media and/or other content through MN 134. For the MN 134 to facilitate communication between movable objects 106, 108, 110, 112 within MN 134 close proximity within a defined range can be achieved to link back to other points from which the information originated. To maintain and/or optimize communication within MN 134, location and movement components (e.g., location and movement component 122) can be employed to optimize movement.

To facilitate optimization of communication between movable objects, movable objects might be controlled to be closer or further apart than typically designated employing conventional cruise control, which tends to consider only space and positional control information as factors for movement control. For example, if there is a wireless access device between movable objects 106, 108, and basic cruise control is being employed, movable object 106 might be controlled to be very close to the wireless access device and movable object 108 might be controlled to be a significant distance away because of the high speed driving by the driver of movable object 108. However, the ability to send data from movable object 106 to movable object 108 will tend to be limited in this scenario because of the distance between movable object 106 and movable object 108.

However, if MN device 114 and MN device 116 are configured to optimize communication between movable objects 106, 108 in MN 134, MN devices 114, 116 can generate information for causing movable objects 106, 108 to be one or more different determined distances from one another and/or from the wireless access device from which the data is received to improve communication between movable objects 106, 108.

In various embodiments, MN devices 114, 116 consider a number of factors to determine information to generate for causing movement of movable objects 106, 108. By way of example, but not limitation, MN devices 114, 116 can consider a number or arrangement of cars in the general area on the road, proximity to wireless access devices, naturally-occurring factors (e.g., terrain such as mountains, storm conditions resulting in signal interference), time of day (e.g., amount of wireless communication traffic in morning, at rush hour/on holidays, during off-peak times/days), if the power of a signal is optimized and/or signal strength/power (e.g., considering attenuation).

Figure 2:
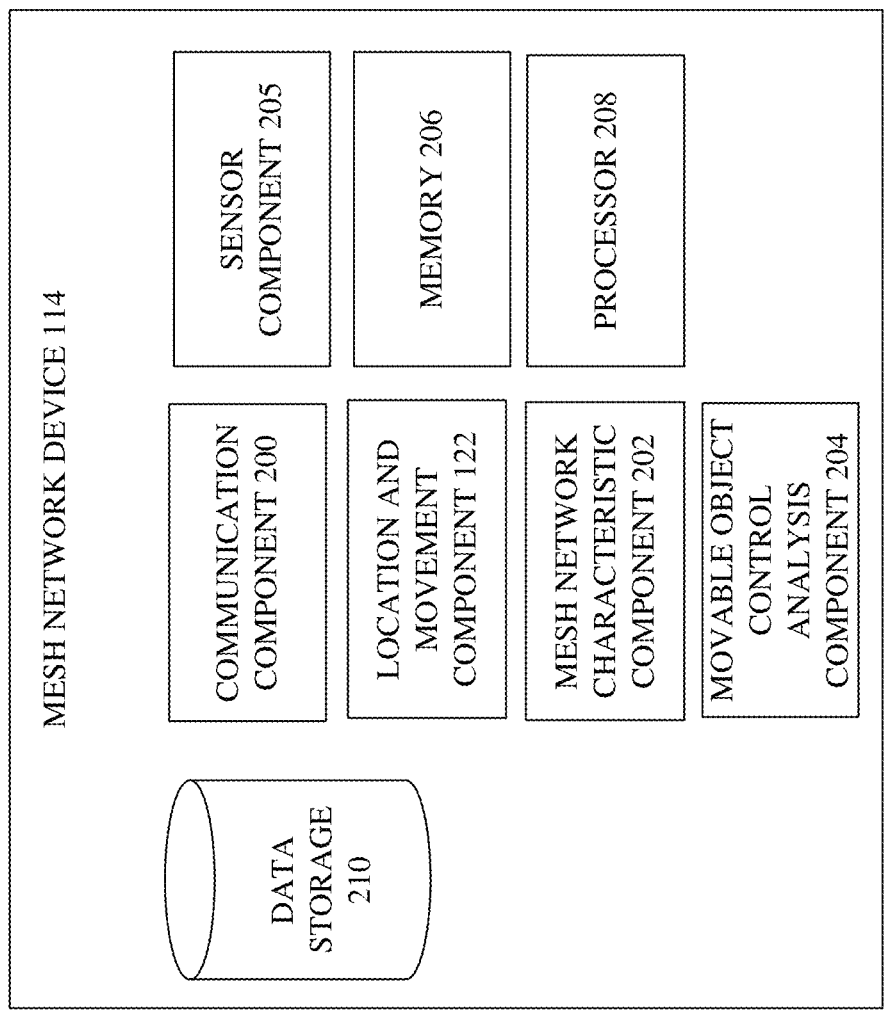
FIG. 2 illustrates an example block diagram of a MN device of a movable object of the system of FIG. 1 for facilitating wireless communication via a MN of connected movable objects in accordance with one or more embodiments described herein.
Figure 3:
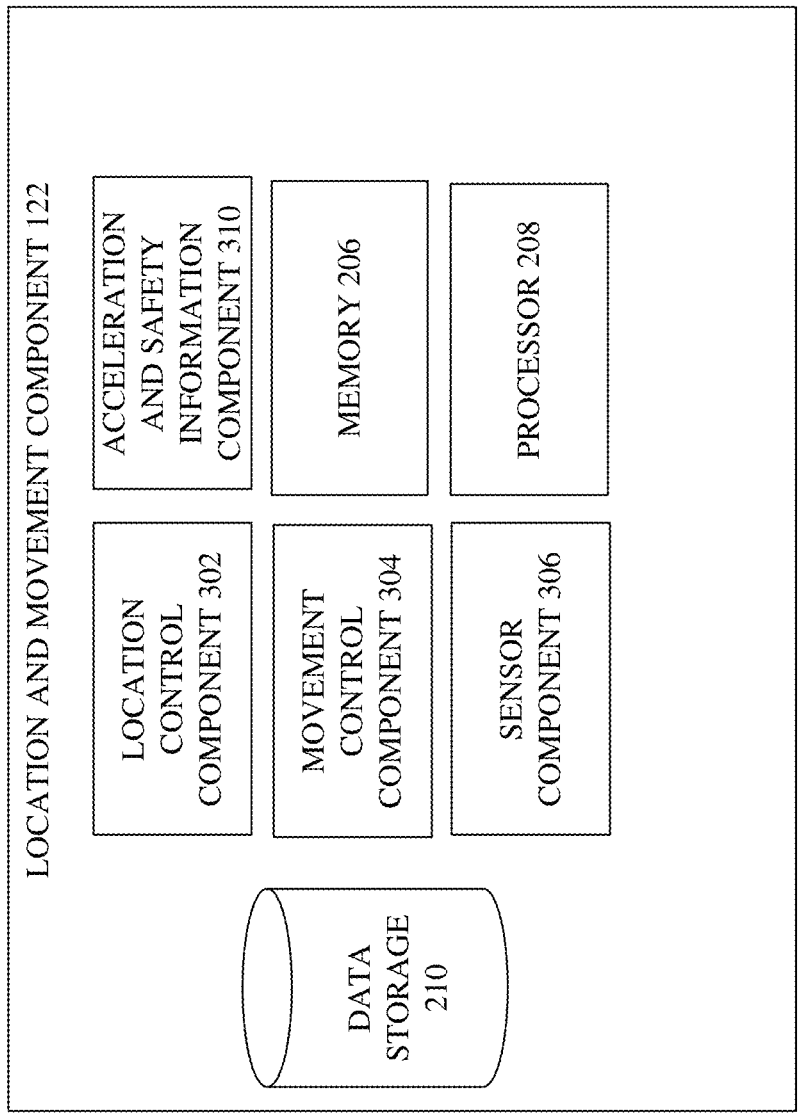
FIG. 3 illustrates an example block diagram of a location and movement component of the MN device of FIG. 2 for facilitating wireless communication via a MN of connected movable objects in accordance with one or more embodiments described herein.
Figure 4:
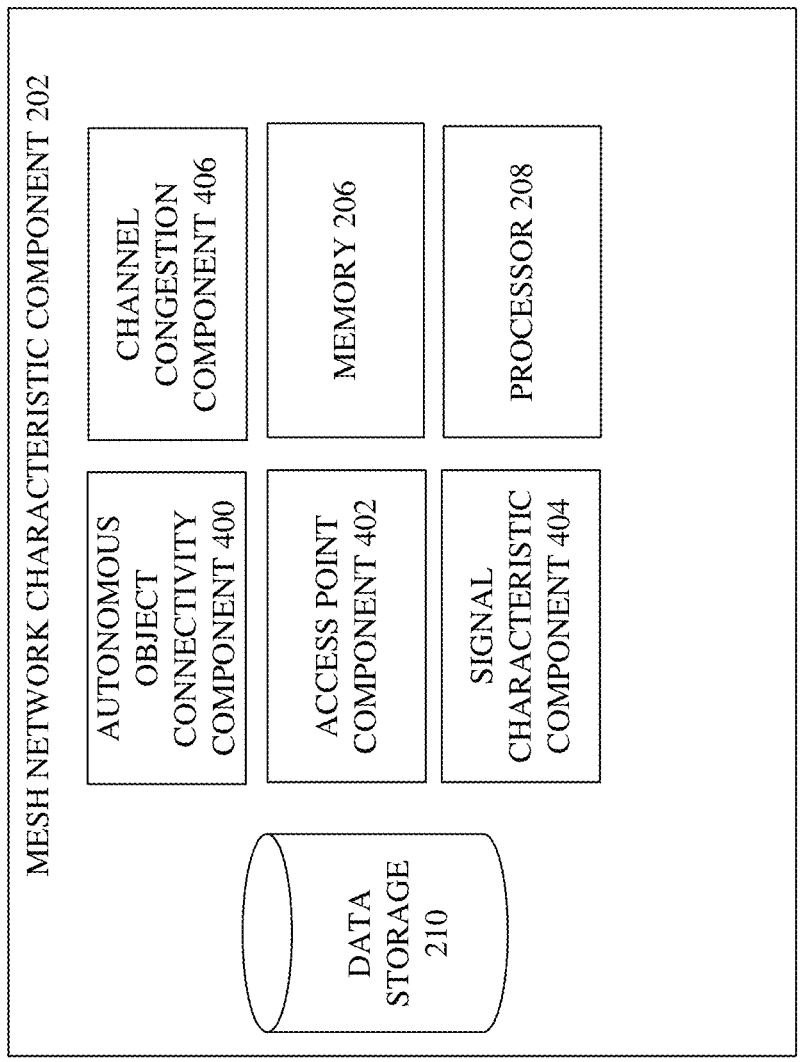
FIG. 4 illustrates an example block diagram of a MN characteristic component of the MN device of FIG. 2 for facilitating wireless communication via a MN of connected movable objects in accordance with one or more embodiments described herein.

Movable object 106, MN device 114 and/or location and movement component 122 will be further described with reference to FIGS. 2, 3 and 4. FIG. 2 illustrates an example block diagram of a MN device of a movable object of the system of FIG. 1 for facilitating wireless communication via a MN of connected movable objects in accordance with one or more embodiments described herein. FIG. 3 illustrates an example block diagram of a location and movement component of the MN device of FIG. 2 for facilitating wireless communication via a MN of connected movable objects in accordance with one or more embodiments described herein. FIG. 4 illustrates an example block diagram of a MN characteristic component of the MN device of FIG. 2 for facilitating wireless communication via a MN of connected movable objects in accordance with one or more embodiments described herein. Repetitive description of like elements employed in respective embodiments of systems and/or apparatus described herein are omitted for sake of brevity.

Turning first to FIG. 2, one embodiment of MN device 114 is shown. In this embodiment, MN device 114 includes communication component 200, location and movement component 122, MN characteristic component 202, movable object control analysis component 204, sensor component 205, memory 206, processor 208 and/or data storage 210. One or more of communication component 200, location and movement component 122, MN characteristic component 202, movable object control analysis component 204, sensor component 205, memory 206, processor 208 and/or data storage 210 can be electrically and/or communicatively coupled to one another to perform one or more functions of MN device 114. Repetitive description of like elements employed in respective embodiments of systems and/or apparatus described herein are omitted for sake of brevity.

With reference to FIGS. 1 and 2, communication component 200 can include hardware, software and/or a combination of hardware and software configured to transmit and/or receive information (e.g., information 136) from and/or to MN device 114. For example, in various embodiments, communication component 200 can transmit and/or receive any of a number of different types of information including, but not limited to, images, voice, video, text, data or the like. Accordingly, communication component 200 can facilitate a number of different types of functions including, but not limited to, social media correspondence, remote monitoring of a home or office, access of bank or other financial accounts or the like. In some embodiments, the information transmitted and/or received can be secured with encryption or other mechanisms that allow only the intended recipient to access the information albeit the other movable objects that are forwarding the information can determine the intended recipient and thereby forward the information in an efficient manner.

In some embodiments, communication component 200 receives the information from a location outside of MN 134. In other embodiments, communication component 200 receives the information from another movable object.

The information can be intended for movable object 106 as a final destination in some embodiments while, in other embodiments, the information can be transmitted along a communication path from the initial movable object that receives the information and communication component 200 can forward the information along one or more of the communication paths that communication component 200 can access by virtue of movable object (e.g., movable object 106) being connected to the communication path.

MN device 114 can also include sensor component 205. Sensor component 205 can sense and/or determine the location of one or more movable objects in MN 134. For example, sensor component 205 can include one or more sensing devices configured to determine global positioning system information for location of a movable object in MN 134. In some embodiments, sensor component 205 can determine the latitude and longitude of a movable object in MN 134. In some embodiments, sensor component 205 can generate information indicative of whether a movable object is in a first lane or a second lane on a roadway and/or positional information such as whether a first movable object is in front of, behind or substantially next to a second movable object. As an example, in some embodiments, sensor component 205 for movable object 106 can determine that movable object 108 is in a same lane with movable object 106 and movable object 112 is in a different lane from movable object 106. As another example, in some embodiments, sensor component 205 can determine that movable object 108 is in front of movable object 106.

MN device 114 can also include MN characteristic component 202. MN characteristic component 202 will be described in further detail with reference to FIG. 4. In the embodiment shown, MN characteristic component 202 includes autonomous object environment component 400, access point component 402, signal characteristic component 404, channel congestion component 406, memory 206, processor 208 and/or data storage 210. In various embodiments, one or more of autonomous object environment component 400, access point component 402, signal characteristic component 404, channel congestion component 406, memory 206, processor 208 and/or data storage 210 can be electrically and/or communicatively coupled to one another to perform one or more functions of MN characteristic component 202. Repetitive description of like elements employed in respective embodiments of systems and/or apparatus described herein are omitted for sake of brevity.

Autonomous object connectivity component 400 can determine the presence or lack of presence of one or more connections between one or more movable objects in MN 134. For example, autonomous object connectivity component 400 can receive a signal from sensor component 205 of MN device 114 indicating that a movable object has been sensed and autonomous object connectivity component 400 can identify the movable object and determine whether one or more wireless channels/connections exist between, for example, movable object 106 and the newly-identified movable object. Access point component 402 can identify the presence of an access point within MN 134. In various embodiments, an access point can be any device associated with a BS or other device facilitating communication in an area in which MN 134 is wholly or partially located.

Signal characteristic component 404 can determine and/or estimate one or more current or future characteristics of a signal transmitted to a movable object from movable object 106 and/or received from a movable object by movable object 106. Signal characteristic component 404 can determine and/or estimate the power of a signal and/or determine received signal strength indicator information. In some embodiments, signal characteristic component 404 can determine the amount of interference that a transmitted and/or received signal is likely to experience (e.g., based on terrain in the movable object is located, level of movable object traffic (e.g., rush hour, holiday, off-peak communication times, peak communication times), weather occurrences (e.g., storms) or the like. The information used by signal characteristic component 404 can be historical information accessed by signal characteristic component 404 and/or current information measured and/or determined by signal characteristic component 404. For example, signal characteristic component 404 can determine the time/day and based on current or historical traffic patterns and/or traffic loading on channels within MN 134, can determine the likelihood of signal interference. As another example, signal characteristic component 404 can determine and/or access information about the terrain (e.g., mountains, valley location) in the region proximate to the movable object and determine the likelihood of signal interference.

Channel congestion component 406 can measure and/or determine a level of traffic congestion on a wireless communication channel between the movable objects. In some embodiments, channel congestion component 406 can determine whether the current or estimated future congestion level satisfies or exceeds a threshold, which may change from time to time. In other embodiments, channel congestion component 406 can determine whether there is a current or future likelihood of traffic congestion on a particular communication path that is higher than a defined threshold.

Turning back to FIG. 2, MN device can also include movable object control analysis (MOCA) component 204. MOCA component 204 can receive information generated by MN characteristic component 202 and/or sensor component 205 and/or information received by communication component 200 and generate information for use by location and movement component 122 to cause specific movement of movable object 106. The information can take into account and use as a guide the enhancement, optimization and/or establishment of channels/connections between movable objects in MN 134. As such, the decision-making by MOCA component 204 can be directed towards the goal of improving communication of information transmitted within MN 134.

For example, if autonomous object environment component 400 outputs information indicative of detection of one or more movable objects in the MN with which the movable object associated with MN device 114 is not currently connected, movable object control analysis component 204 can generate information for initiating establishment of a wireless communication channel with the one or more detected movable objects.

As another example, signal characteristic component 404 and/or channel congestion component 406 indicate that channel conditions between the movable object associated with MN device 114 and another movable object can be improved (e.g., interference or congestion reduced) if the movable objects were closer to one another, MOCA component 204 can generate information that can be received by location and movement component 122 to cause movement of one or more of the movable objects to bring the two movable objects in closer proximity to one another. For example, the information generated by MOCA component 204 can be for acceleration of movable object 106 towards movable object 108 to overcome interference detected or future interference estimated by signal characteristic component 404.

In other embodiments, in the above-referenced cases, movable object control analysis component 204 can generate control information that can be employed by a MN device of another movable object to cause the MN device of movable object 106 and the MN device of another movable object to make a coordinated effort to move their respective movable objects closer to one another.

As shown in FIG. 2, MN device 114 can also include location and movement component 122. Location and movement component 122 will be described in greater detail with reference to FIG. 3. While the embodiment shown in FIG. 2 includes location and movement component 122 within MN device 114 as shown and described with reference to FIG. 1, in some embodiments, location and movement component 122 can be a separate component from MN device 114 and can be merely electrically and/or communicatively coupled to MN device 114. For example, with reference to FIGS. 1 and 2, in some embodiments, one or more of the MN devices 114, 116, 118, 120 can determine appropriate input to location and movement components 122, 124, 126, 128 at movable objects 114, 116, 118, 120 to cause location and movement components 122, 124, 126, 128 to perform movement determined to enhance and/or establish communication between one or more movable objects 106, 108, 110, 112 in MN 134.

Turning to FIG. 3, in some embodiments, location and movement component 122 can include location control component 302, movement control component 304, sensor component 306, acceleration and safety information (AASI) component 310, memory 206, processor 208 and/or data storage 210. Repetitive description of like elements employed in respective embodiments of systems and/or apparatus described herein are omitted for sake of brevity.

Location control component 302 can cause the movable object (e.g., movable object 106) to move to a location. The location can be fixed or dynamically change from time to time. The location can be identified any number of ways including, but not limited to, latitude and longitude, a particular lane of interest (e.g., controlling lane change) or the like. For example, location control component 302 can receive control information generated by MOCA component 204 directing location control component 302 to change lanes. The information the location can be a latitude and/or longitude for the movable object based on information obtained and/or processed by sensor component 205.

Movement control component 304 can cause the movable object to change speed (e.g., move at a defined speed, accelerate or decelerate), velocity (e.g., speed and/or direction), path (vertical, horizontal, diagonal or otherwise), two-dimensional trajectory and/or three-dimensional trajectory. For example, a three-dimensional trajectory can include a trajectory for a movable object such as a connected drone or a connected submarine. Movement control component 304 can also perform intelligent cruise control and/or self-driving functions.

Sensor component 306 can include sensing mechanisms to determine whether movable object is dangerously close to another movable object. If sensor component 306 determines that movable object is dangerously close to another movable object, sensor component 306 can generate a signal that can be employed by movement control component 304 to cause movable object to reduce speed, alter velocity and/or otherwise change path or trajectory (e.g., three-dimensional trajectory). In another embodiment, if sensor component 306 determines that another movable object is in a region of the environment that location and movement component 122 has been directed to move to, sensor component 306 can generate a signal that can be employed by location control component 302 to override the information generated by MOCA component 204 and prevent the movement into such region of the environment.

AASI component 310 can access safety information to determine whether movable object 106 is operating within dictated safety parameters (e.g., safety parameters set by National Highway Transportation Safety (NHTS) Board) and/or based on one or more parameters set by or based on the driver, occupant, owner and/or operator of a movable object, which can vary by the type of environment (e.g., highway, residential street, airspace, waterway) on or within which movable object 106 is traveling, travel or weather conditions (e.g., rain, sleet, snow conditions, typhoon, hurricane, tornado) or the like. Accordingly, while MOCA component 204 can determine that a movable object should accelerate 5 miles per hour to optimize the communication channel between movable object 106 and movable object 108, for example, AASI component 310 can limit the acceleration to 3 miles per hour to avoid movable object 106 exceeding a defined parameter value for speed set by NHTS.

Turning back to FIG. 2, memory 206 can be a computer-readable storage medium storing computer-executable instructions and/or information for performing the functions described herein with reference to MN device 114, system 100, location and movement component 122, movable object 106 (and/or any component of MN device 114, system 100, location and movement component 122, movable object 106). For example, memory 206 can store computer-executable instructions that can be executed by processor 208 to perform communication, evaluation, decision-making or other types of functions executed by MN device 114, system 100, location and movement component 122, movable object 106. Processor 208 can perform one or more of the functions described herein with reference to MN device 114, system 100, location and movement component 122, movable object 106 (or any component thereof). For example, processor 208 can evaluate location and/or movement of one or more movable objects, relative location and/or relative movement of one or more movable objects, absence or presence of one or more wireless communication channels between two or more movable objects or the like. Any number of different functions described herein for facilitating wireless communications within MNs of connected movable objects can be performed utilizing processor 208.

Figure 5:
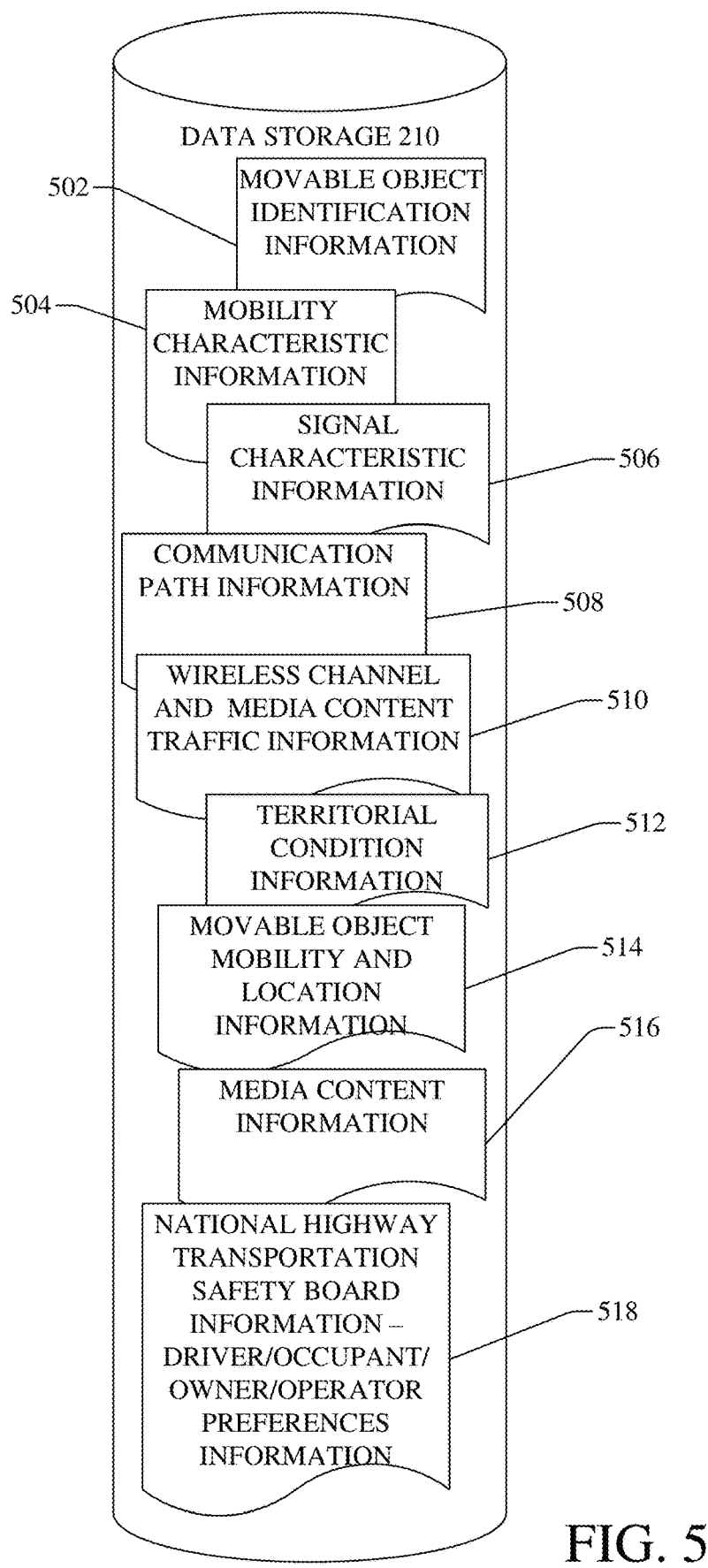
FIG. 5 illustrates an example block diagram of data storage of the MN device of FIG. 2 for facilitating wireless communication via a MN of connected movable objects in accordance with one or more embodiments described herein.

Data storage 210 can be described in greater detail with reference to FIG. 5. FIG. 5 illustrates an example block diagram of data storage of the MN device of FIG. 2 for facilitating wireless communication via a MN of connected movable objects in accordance with one or more embodiments described herein. As shown, data storage 210 can be configured to store information accessed by, received by and/or processed by MN device 114, location and movement component 122 and/or movable object 106. For example, data storage 210 can store movable object identification information 502 (e.g., information identifying one or more movable objects detected in a MN), mobility characteristic information 504 (e.g., information describing movement, acceleration, deceleration, speed, relative acceleration, relative deceleration, relative speed and/or location of one or more movable objects in a MN), signal characteristic information 506 (e.g., information describing power of a signal transmitted and/or received over a wireless channel of the MN), communication path information 508 (e.g., information describing the movable objects that make up a particular communication path in the MN), wireless channel and media content traffic information 510, territorial condition information 512 (e.g., current and/or historical information describing the fading or geographical conditions of one or more different areas), movable object mobility and location information 514 (e.g., information for causing movement of a movable object to improve a channel condition, establish a connection or the like), media content information 516 (e.g., information describing media content being transmitted to and/or from a movable object) and/or NHTS Board information Driver/Occupant/Owner/Operator preferences information 518 (e.g., parameters and/or parameter values established by NHTS Board and/or driver, operator, occupant or owner of movable object).

Figure 6:
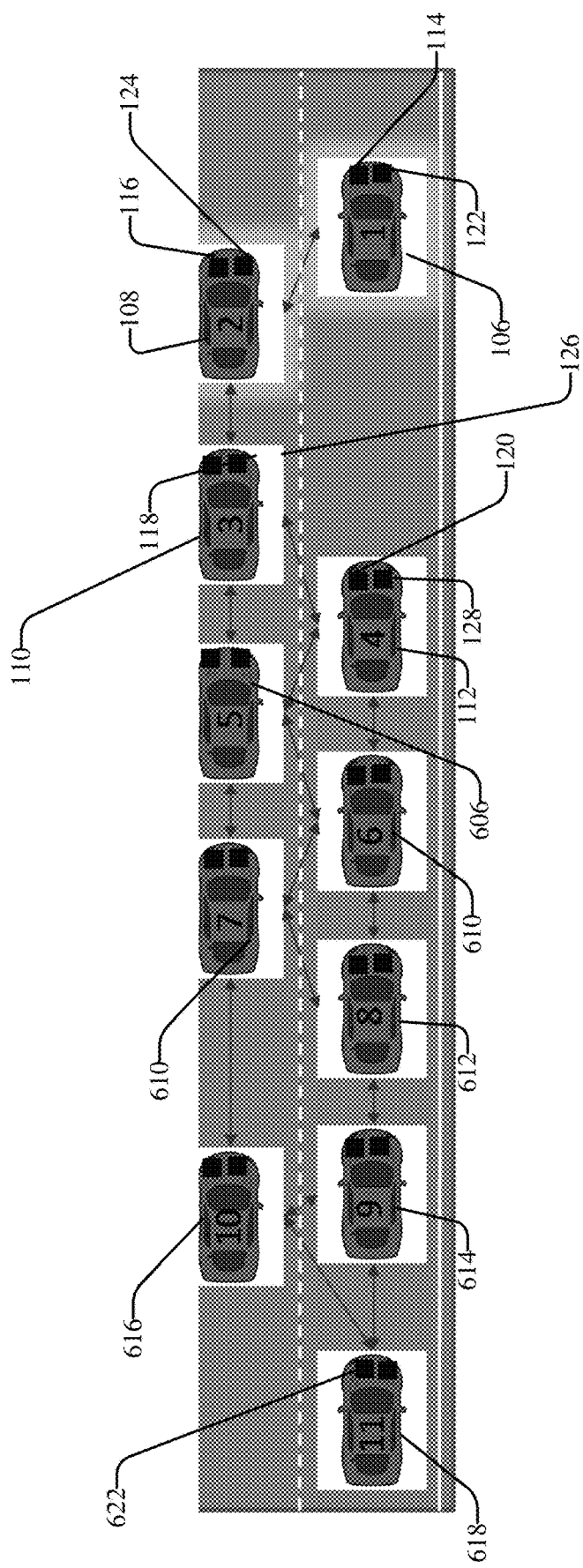
FIGS. 6-13 illustrate example block diagrams of example operations within the system of FIG. 1 for facilitating wireless communication via a MN of connected movable objects in accordance with one or more embodiments described herein.

FIGS. 6-13 illustrate block diagrams of example operations within the system of FIG. 1 for facilitating wireless communication via a MN of connected movable objects in accordance with one or more embodiments described herein. As shown in FIG. 6, content has at least two paths through which to travel within the MN for paths that include movable objects 106, 108. Traffic congestion (e.g., a bottleneck) exists between movable objects 106, 108. In the embodiment shown in FIG. 6, movable object 106 only has one wireless channel/connection (e.g., the wireless channel/connection between movable object 106 and movable object 108). As such, all of the information for movable object 106 comes from movable object 108.

Figure 7:
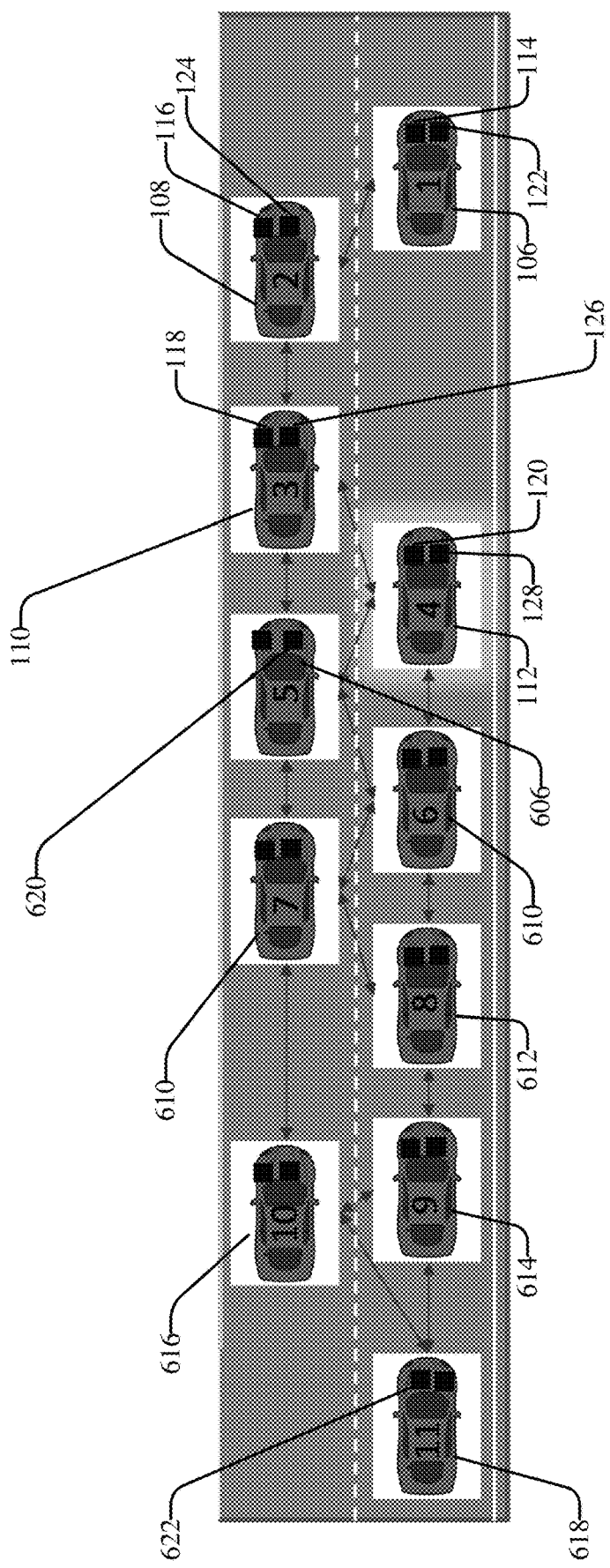

As shown in FIG. 7, MN device 114 associated with movable object 112 can detect the presence of another movable object (e.g., movable object 106) in the area (e.g., lane) ahead of object 112. However, in the embodiment shown, the distance between movable object 112 and movable object 106 is too large for a communication signal to be established. Movable object 112 can also be notified by movable object 106, movable object 108 or movable object 110 via indirect connections (e.g., via MN devices of other movable objects) that an opportunity exists for movable object 112 to improve communications within the MN.

Figure 8:
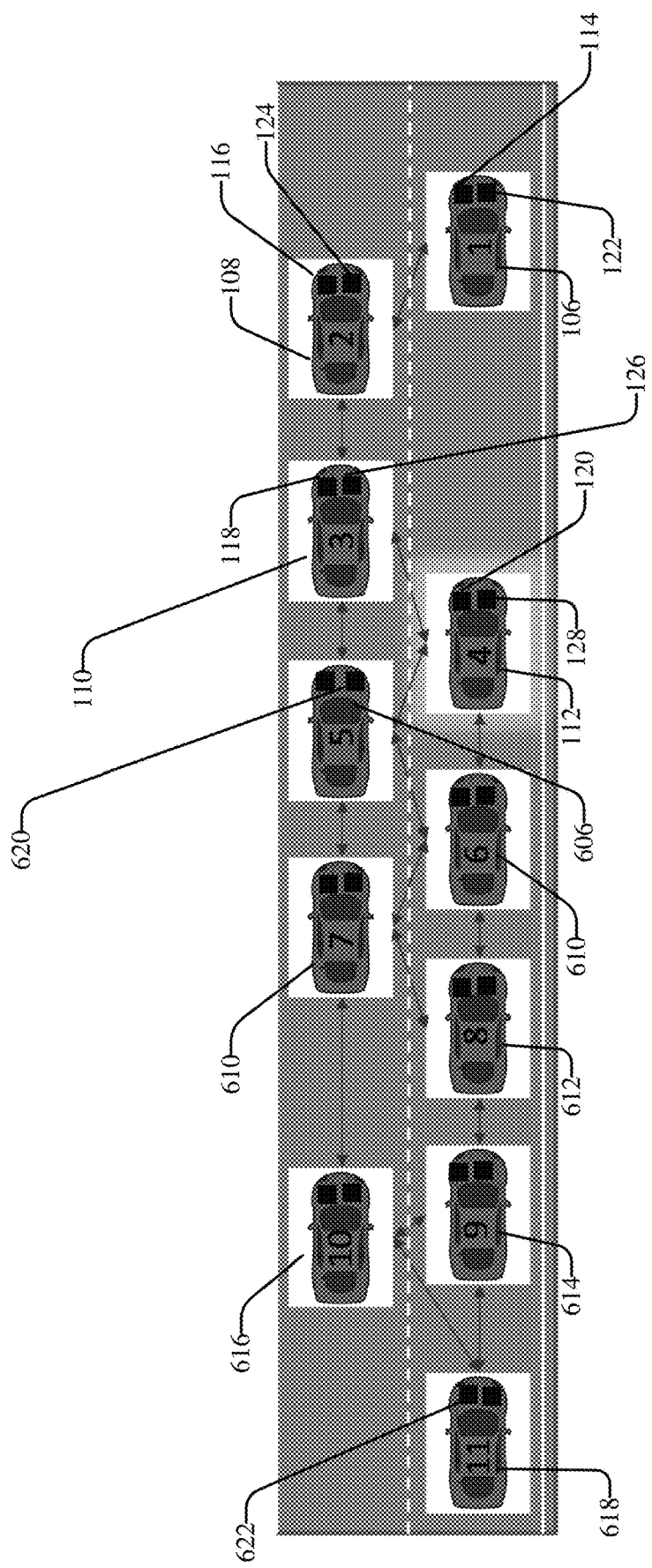
Figure 9:
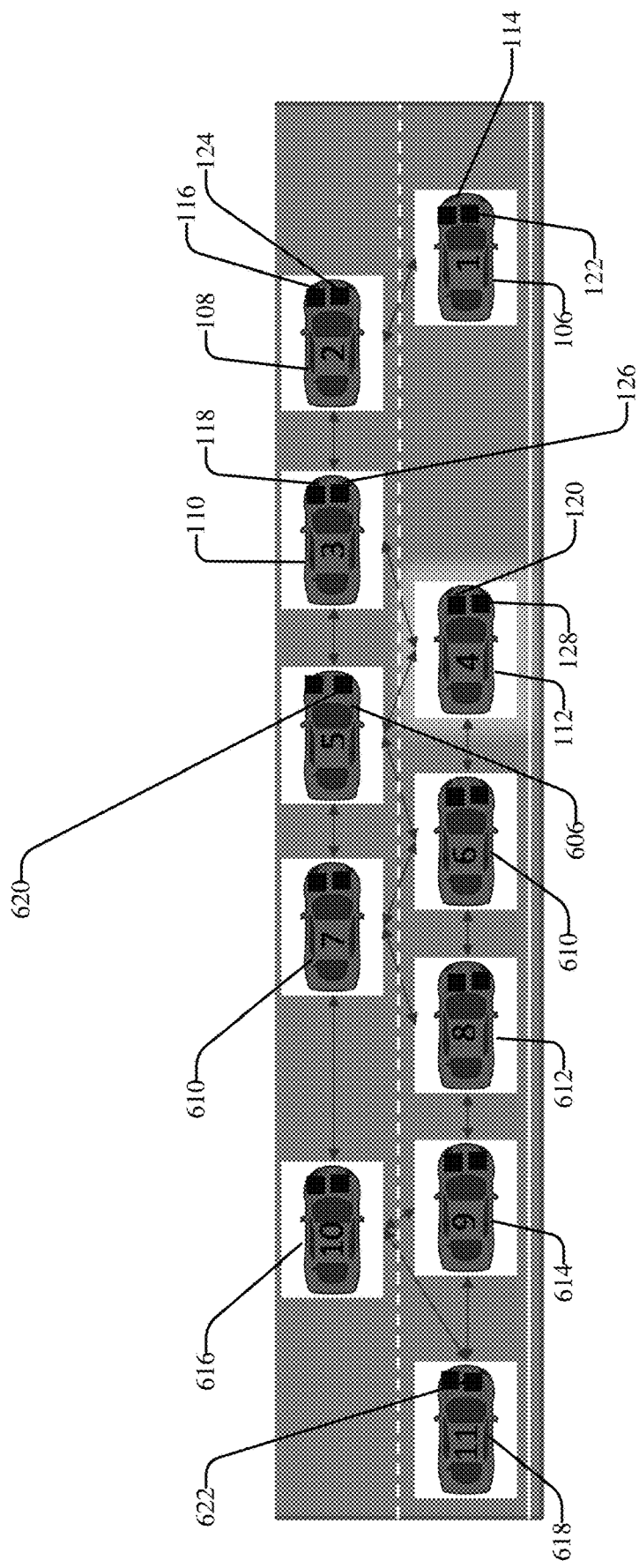

FIG. 8 is an embodiment of a next step in time that can be performed based on the notification of opportunity received by movable object 112. In particular, MN device 114 in movable object 112 can provide input to MN device 120 for movable object 112 indicating the need to accelerate until the distance between movable object 112 and movable object 106 is short enough that a connection can be established. MN device 120 and/or location and movement component 128 of movable object 112 can compare the input with current safety and traffic preferences and settings and determine an acceptable acceleration rate. Acceleration towards movable object 106 by movable object 112 is shown in FIG. 9.

Figure 10:
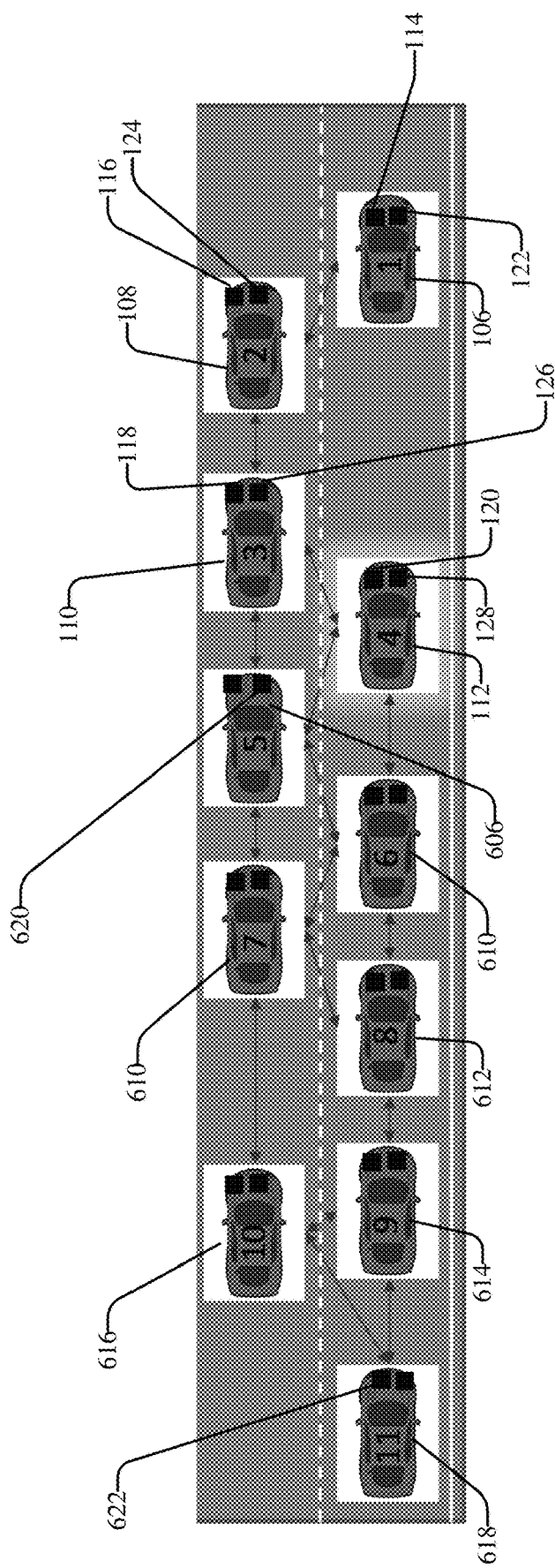

As shown in FIG. 10, movable object 112 accelerates in a direction at which movable object 106 is located thereby reducing the distance between movable object 112 and movable object 106. MN device 114 can receive notification about the acceleration by movable object 112 and/or simply detect/sense the presence of movable object 112 at a location closer to movable object 106 than previously detected/sensed.

Figure 11:
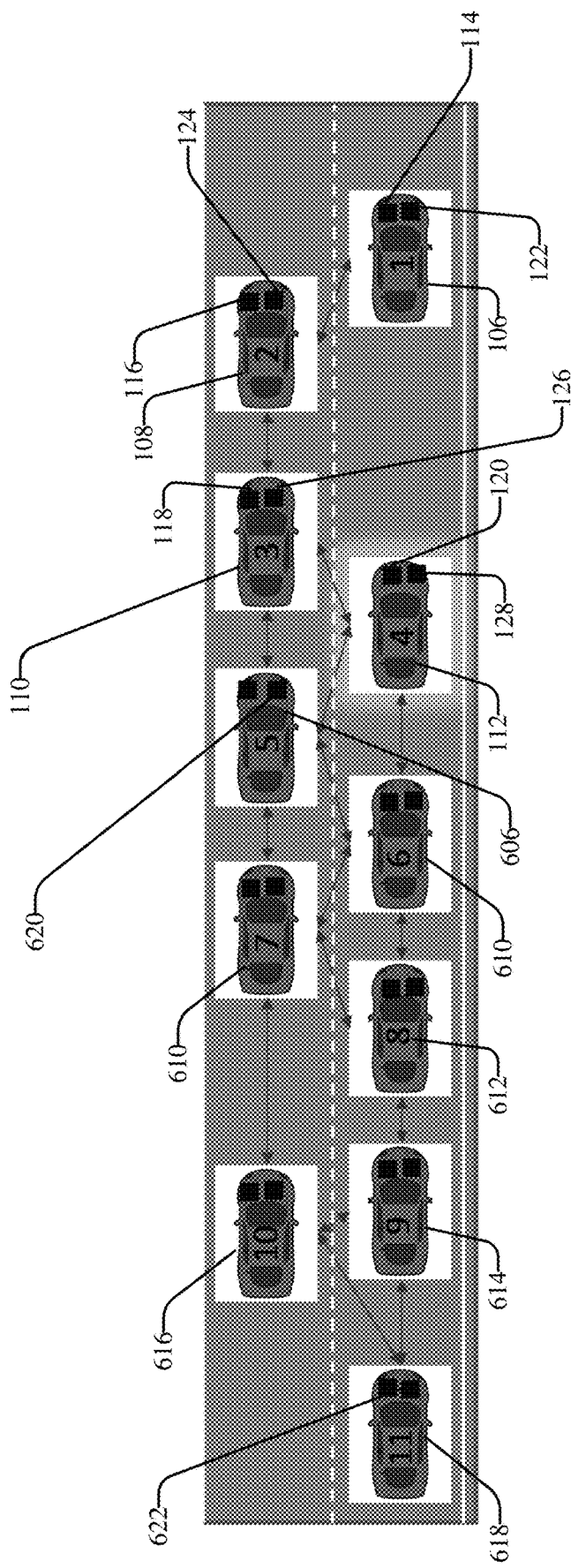

In FIG. 11, movable object 112 can communicate the planned change to movable objects 606, 608 or the MN devices 116, 118 in movable objects 606, 608 can observe the change transpiring of movable object 112 moving towards movable object 106. In either embodiment, as the distance between movable object 112 and movable object 606 and/or as the distance between movable object 112 and movable object 608 increases, one or more of movable objects 606 and/or movable object 608 can identify and/or evaluate the situation of the extended distance between the movable object and movable object 112.

Figure 12:
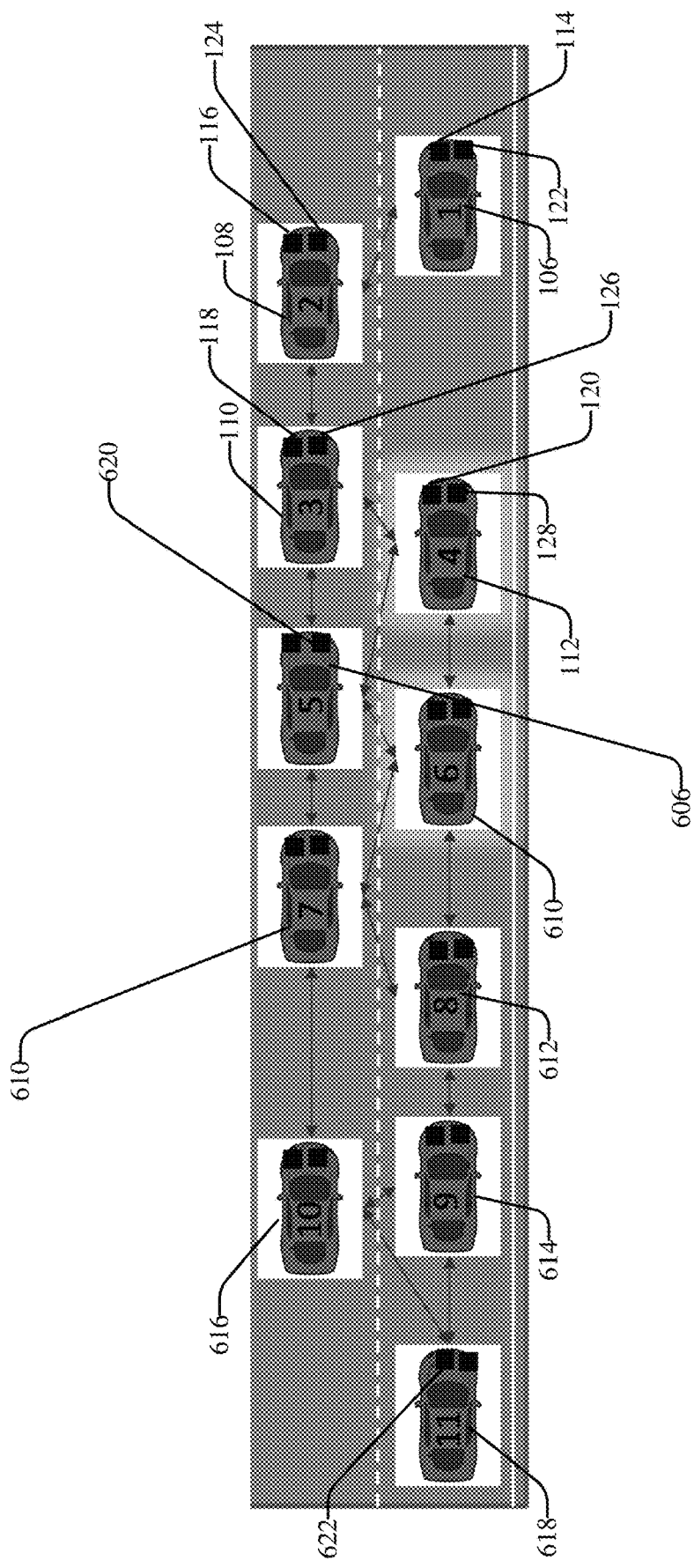

Turning now to FIG. 12, MN device 120 in movable object 608 can generate information to cause the location and movement component of movable object 608 to accelerate as well to improve the likelihood of being within a distance of movable object 112 that allows/facilitates communication between movable object 112 and movable object 608.

However, in some embodiments, a MN device can determine that wireless connections between movable objects cannot be improved by accelerating without exceeding safety and traffic preferences and settings. By way of example, MN device 620 in movable object 606 can determine that connections cannot be improved by accelerating without exceeding safety and traffic preferences and settings.

Figure 13:
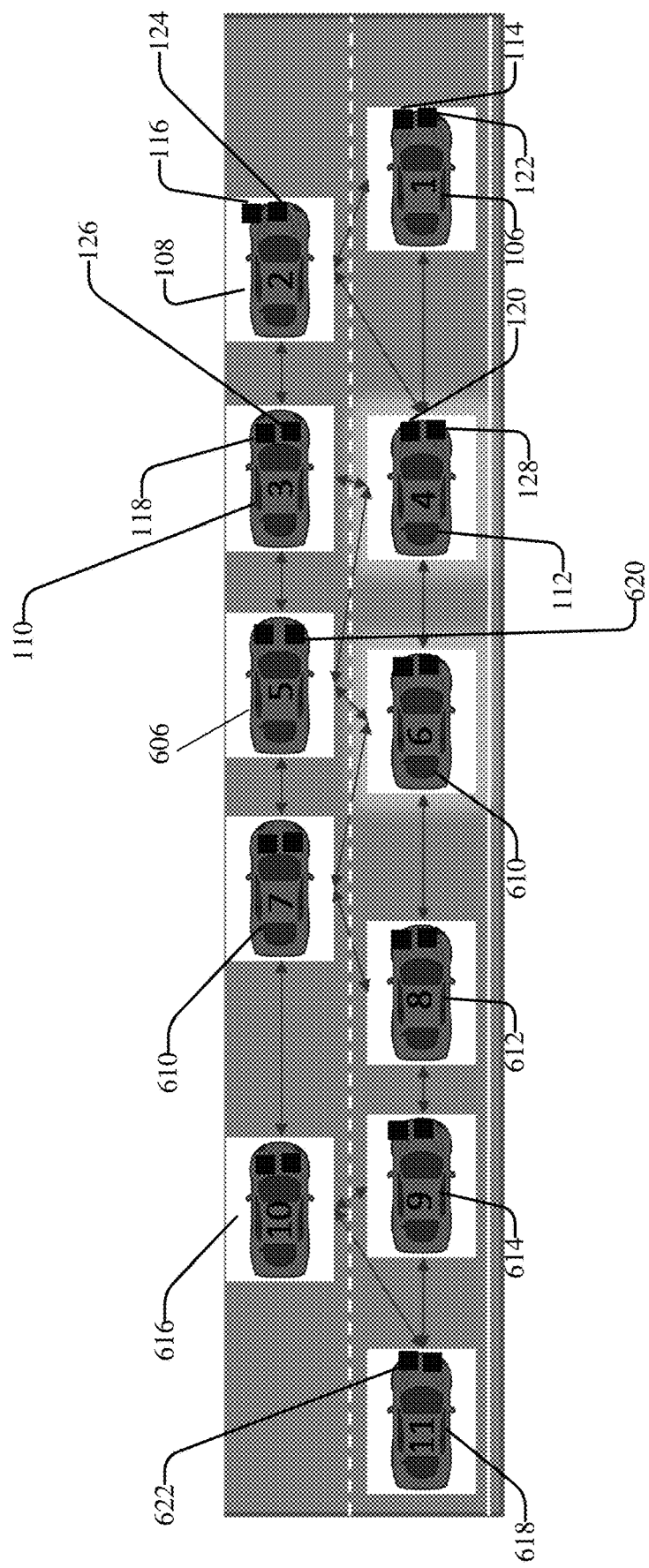

As shown in FIG. 13, movable object 112 is now within a range of movable object 106, 108 and can establish a channel to one or more of movable objects 106, 108. MN device 622 in movable object 618 can determine that the wireless connection to movable object 608 can be improved by accelerating, and can provide such input to the intelligent cruise control or self-driving system of movable object 618.

One or more steps of the process shown and described with reference to FIGS. 6-13 can be repeated and/or performed to optimize the wireless connections between one or more of the movable cars in MN 134.

In FIG. 13 in which movable objects 112, 610 have moved up closer to movable object 106, there is a new wireless channel/connection established between movable object 106 and movable object 112. Now movable objects 106, 108 can have multiple wireless channels/connections over which information can be transmitted/received to/from movable objects 106, 108. As such, MN devices 114, 116 can determine which communication channel to employ for transmission/receipt of information. The determination can be based on any number factors including, but not limited to, power of the respective wireless channels/connections.

In one embodiment, when communications are deemed of utmost importance (e.g., president or FBI traveling) and connectivity must be maintained at all times with other agencies (National Security Agency) with a certain bandwidth, if there are a group of movable objects (e.g., movable objects 106, 108, 110), MN devices 114, 116, 118 can generate information to control location and movement components 122, 124, 126 to maintain speed such that the distance between the movable objects 106, 108, 110 is such that connectivity between movable objects 106, 108, 110 can be maintained with a certain likelihood. Speed/distance can be adjusted if other factors (e.g., interference conditions) make the likelihood of loss of connectivity higher.

In one or more of these embodiments, the frequency can be non-cellular. For example, one radio in a movable object can be employed for cellular communication and another radio can be employed for communications to facilitate the MN 134. Yet, in some embodiments, another radio can be employed for car telematics and/or personal communications. As such, in some embodiments, the radio in a movable object can be employed for emergency movable object communications (e.g., ONSTAR communications) if another movable object radio is not working. In some embodiments, BLUETOOTH communications can be employed between two or more movable objects.

FIGS. 14-18 illustrate example flowcharts of methods that facilitate wireless communication via a MN of connected movable objects in an environment in accordance with one or more embodiments described herein.

Figure 14:
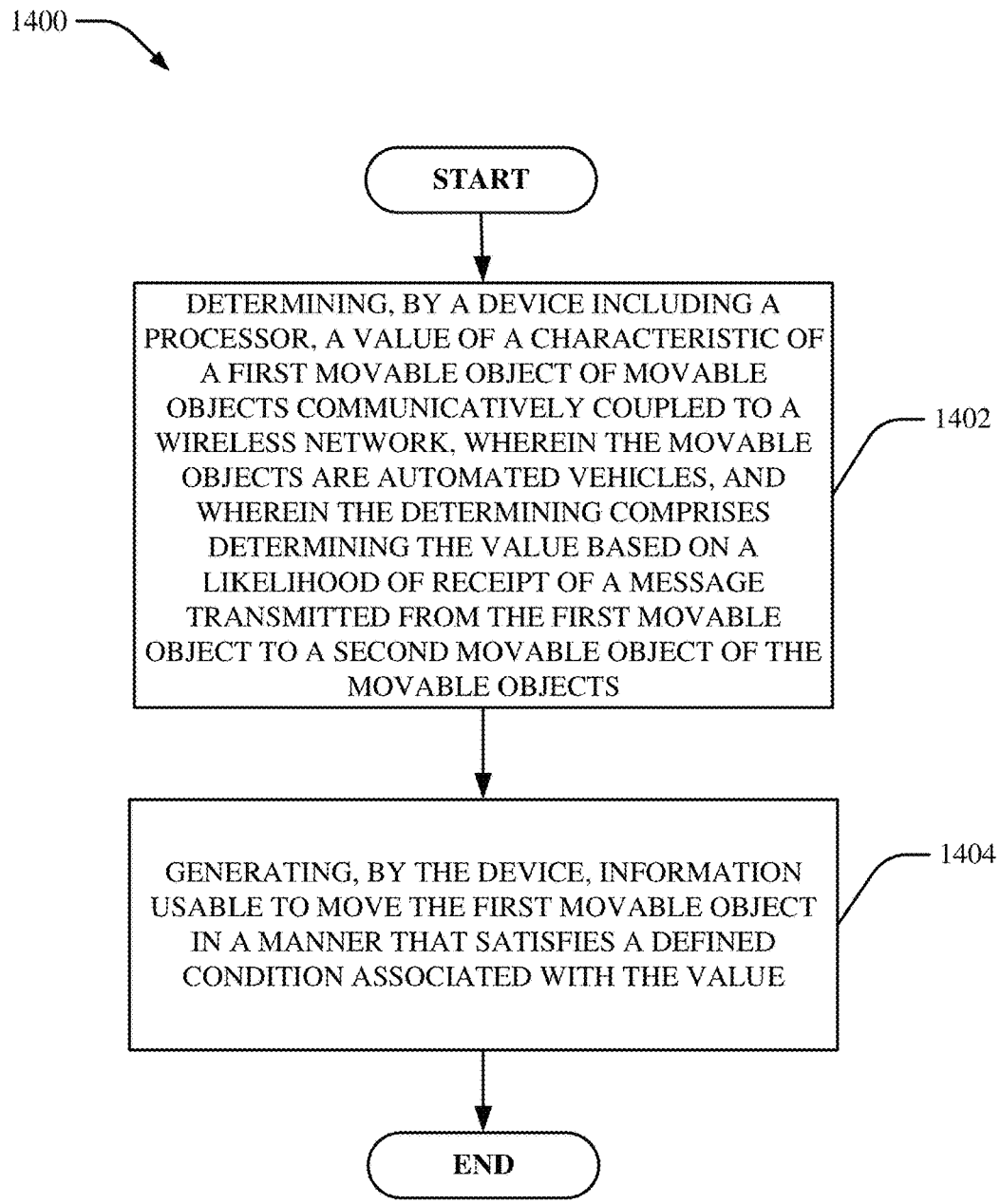
FIGS. 14-18 illustrate example flowcharts of methods that facilitate wireless communication via a MN of connected movable objects in an environment in accordance with one or more embodiments described herein.

Turning first to FIG. 14, at 1402, method 1400 can include determining, by a device including a processor, a value of a characteristic of a first movable object of movable objects communicatively coupled to a wireless network, wherein the movable objects are automated vehicles, and wherein the determining comprises determining the value based on a likelihood of receipt of a message transmitted from the first movable object to a second movable object of the movable objects.

At 1404, method 1400 can include generating, by the device, information usable to move the first movable object in a manner that satisfies a defined condition associated with the value. For example, the value can be the speed of the first movable object.

In some embodiments, the information is first information, and determining the value is based on a distance between the first movable object and a wireless access device configured to transmit content to the first movable object. The message can include second information indicative of the content.

In some embodiments, although not shown, the method can also include determining, by the device, a communication path, via a set of wireless network devices associated with respective ones of the movable objects. The communication path can be from the first movable object to another movable object of the movable objects. In this embodiment, determining the communication path can be based on a determination of an estimated power of a signal including the message.

In another embodiment, although also not shown, the method can also include determining, by the device, a communication path, via a set of wireless network devices associated with respective ones of the movable objects. The communication path can be from the first movable object to another movable object of the movable objects. In this embodiment, determining the communication path can be based on a determination of a defined factor associated with the movable objects. In some embodiments, the defined factor can be the physical arrangement of the movable objects within the wireless network. In some embodiments, the defined factor can be the presence of an adjacent movable object within the wireless network. In some embodiments, the defined factor can be the level of attenuation of power of a signal that includes the message.

Figure 15:
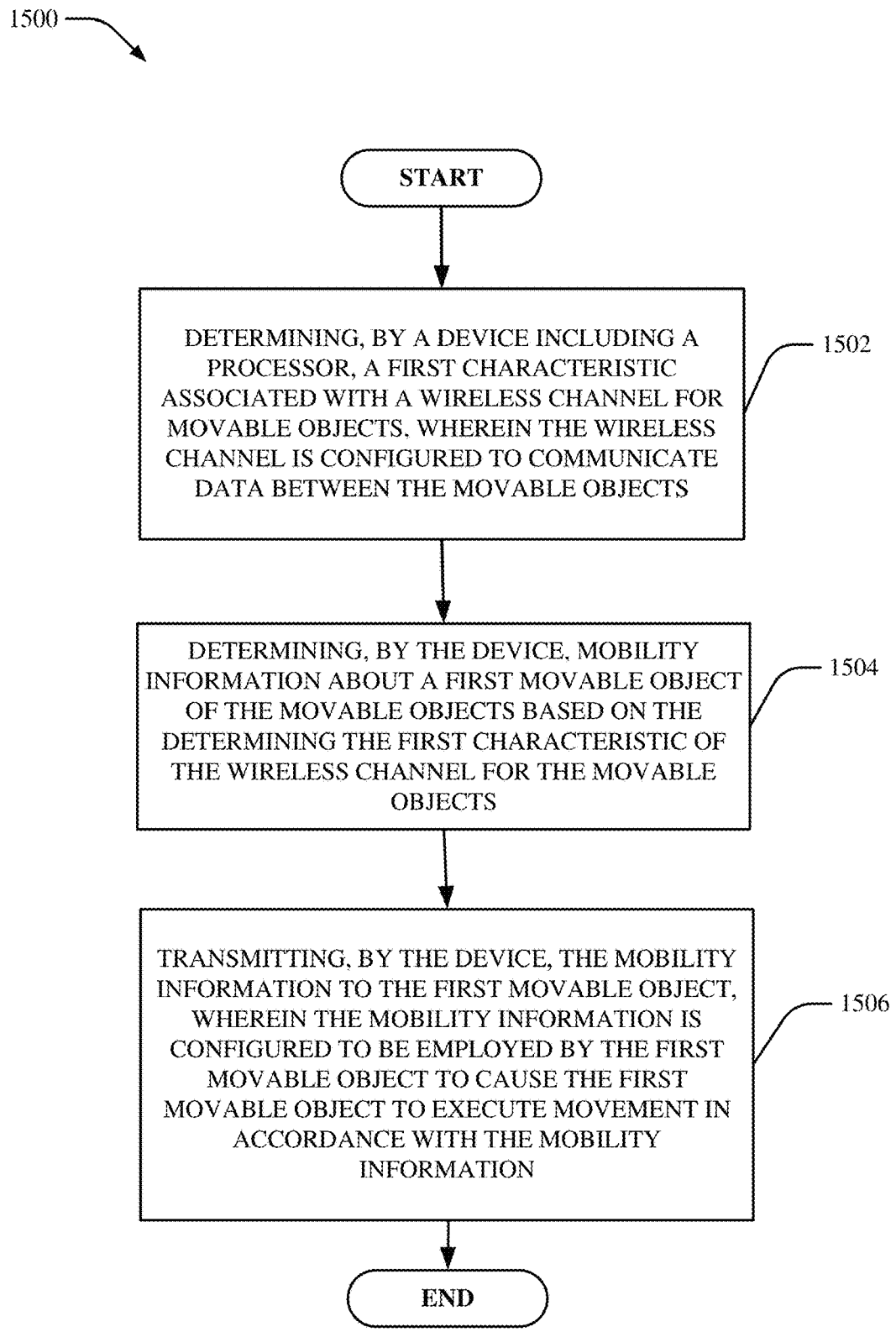

Turning now to FIG. 15, at 1502, method 1500 can include determining, by a device including a processor, a first characteristic associated with a wireless channel for movable objects, wherein the wireless channel is configured to communicate data between the movable objects.

In some embodiments, the first characteristic includes a lack of the wireless channel between the device and a first movable object of the movable objects. In some embodiments, the first characteristic includes a defined level of estimated data congestion for the wireless channel.

At 1504, method 1500 can include determining, by the device, mobility information about the first movable object of the movable objects based on the determining the first characteristic of the wireless channel for the movable objects. The mobility information can include information to cause the device to execute movement towards the first movable object for establishment of a wireless channel. In some embodiments, the mobility information includes information to cause the first movable objects to execute movement to facilitate establishment of a second wireless channel for offloading data traffic from the wireless channel.

At 1506, method 1500 can include transmitting, by the device, the mobility information to the first movable object, wherein the mobility information is configured to be employed by the first movable object to cause the first movable object to execute movement in accordance with the mobility information.

Although not shown, the method can also include determining, by the device, a second characteristic (e.g., throughput) of the wireless channel, wherein the determining the mobility information is further based on determining the second characteristic, and balancing the first characteristic and the second characteristic. For example, the first characteristic can be a three-dimensional coverage area and the second characteristic can be throughput. The method can balance coverage area and throughput of the wireless channel.

Figure 16:
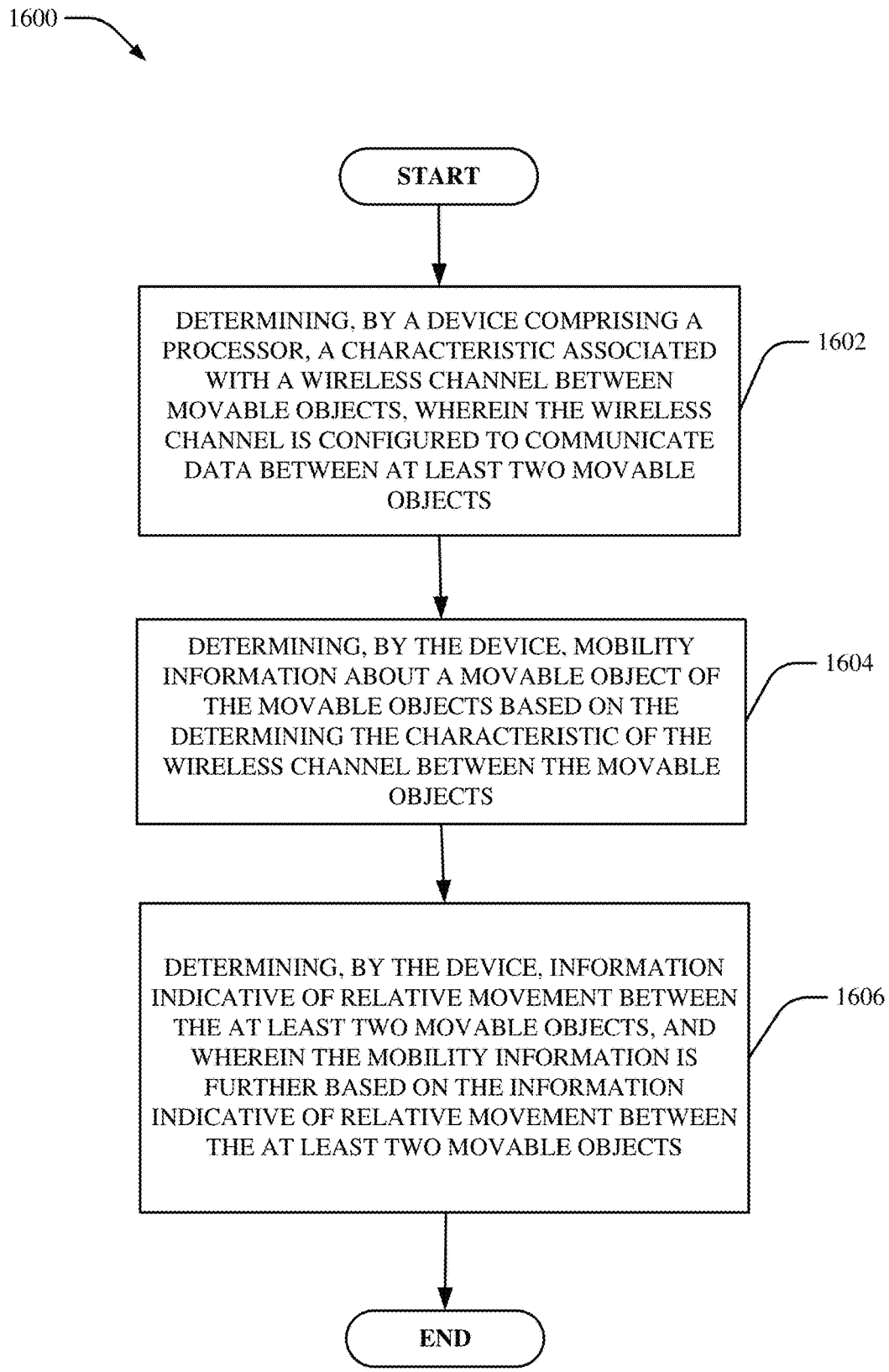

Turning now to FIG. 16, at 1602, method 1600 can include determining, by a device including a processor, a characteristic associated with a wireless channel between movable objects, wherein the wireless channel is configured to communicate data between at least two of the movable objects.

At 1604, method 1600 can include determining, by the device, mobility information about a movable object of the movable objects based on the determining the characteristic of the wireless channel between the movable objects.

At 1606, method 1600 can include determining, by the device, information indicative of relative movement between the at least two movable objects, and wherein the mobility information is further based on the information indicative of relative movement between the at least two movable objects.

Figure 17:
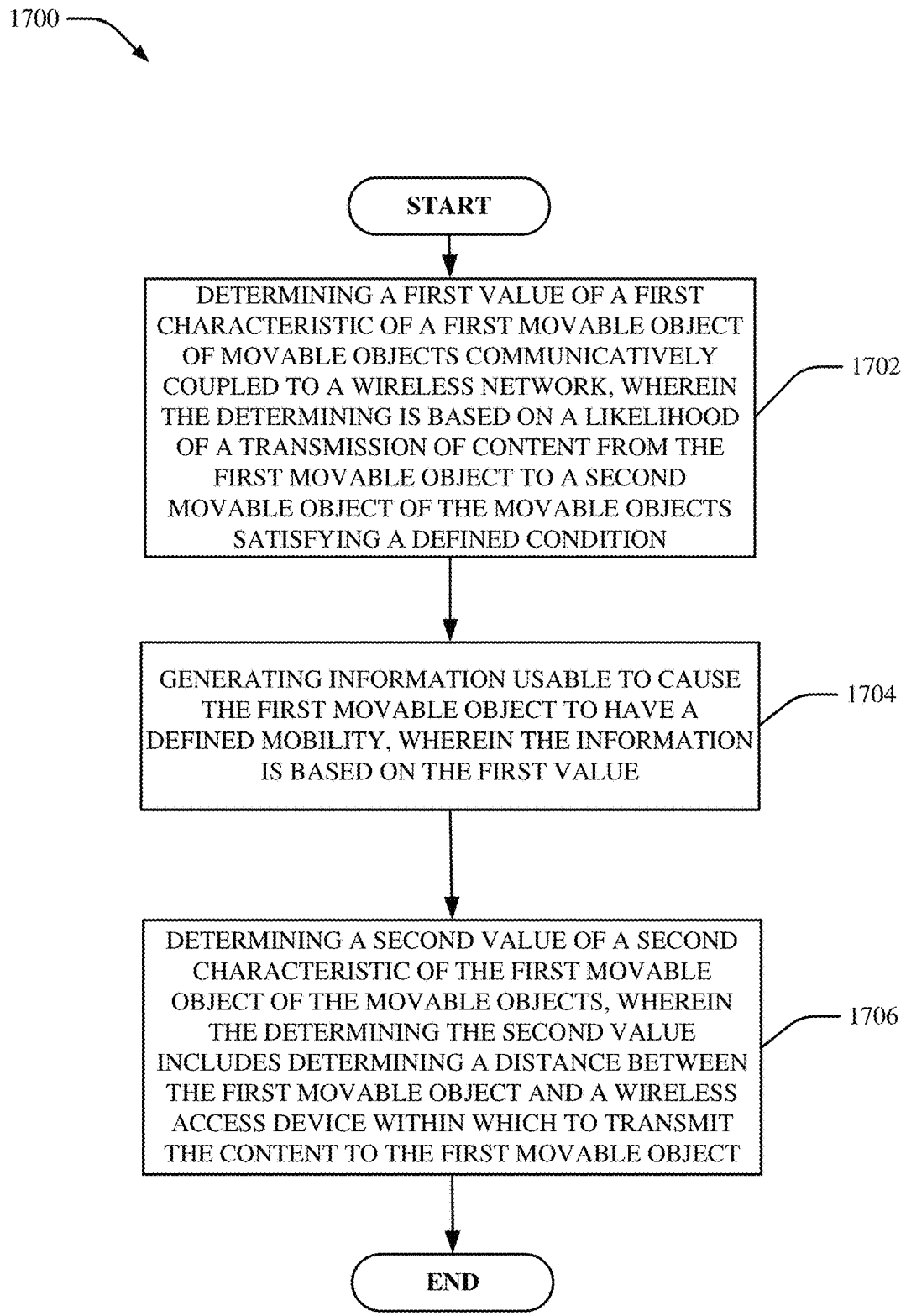

Turning now to FIG. 17, at 1702, method 1700 can include determining a first value of a first characteristic of a first movable object of movable objects communicatively coupled to a wireless network, wherein the determining is based on a likelihood of a transmission of content from the first movable object to a second movable object of the movable objects satisfying a defined condition. At 1704, method 1700 can include generating information usable to cause the first movable object to have a defined mobility, wherein the information is based on the first value.

At 1706, method 1700 can include determining a second value of a second characteristic of the first movable object of movable objects, wherein the determining the second value includes determining a distance between the first movable object and a wireless access device within which to transmit the content to the first movable object.

Although not shown, in some embodiments, the method also includes determining a first communication path, via a set of wireless network devices associated with a first set of respective ones of the movable objects, wherein the first communication path is from the first movable object to another movable object of the movable objects. In some embodiments, determining the first communication path is based on a determination of that an estimated level of congestion of a second communication path between a second set of respective ones of the movable objects satisfies a defined condition. The second communication path can be in operation prior to operation of the first communication path.

In some embodiments, although not shown, the method also includes transmitting information for formation of the first communication path to one or more of the first set of respective ones of the movable objects.

In some embodiments, although not shown, the method also includes determining a first communication path, via a set of wireless network devices associated with a first set of respective ones of the movable objects, wherein the first communication path is from the first movable object to a selected other movable object of the movable objects, and wherein the determining the first communication path is based on a characteristic of a level of security of data to be transmitted over the communication path.

Figure 18:
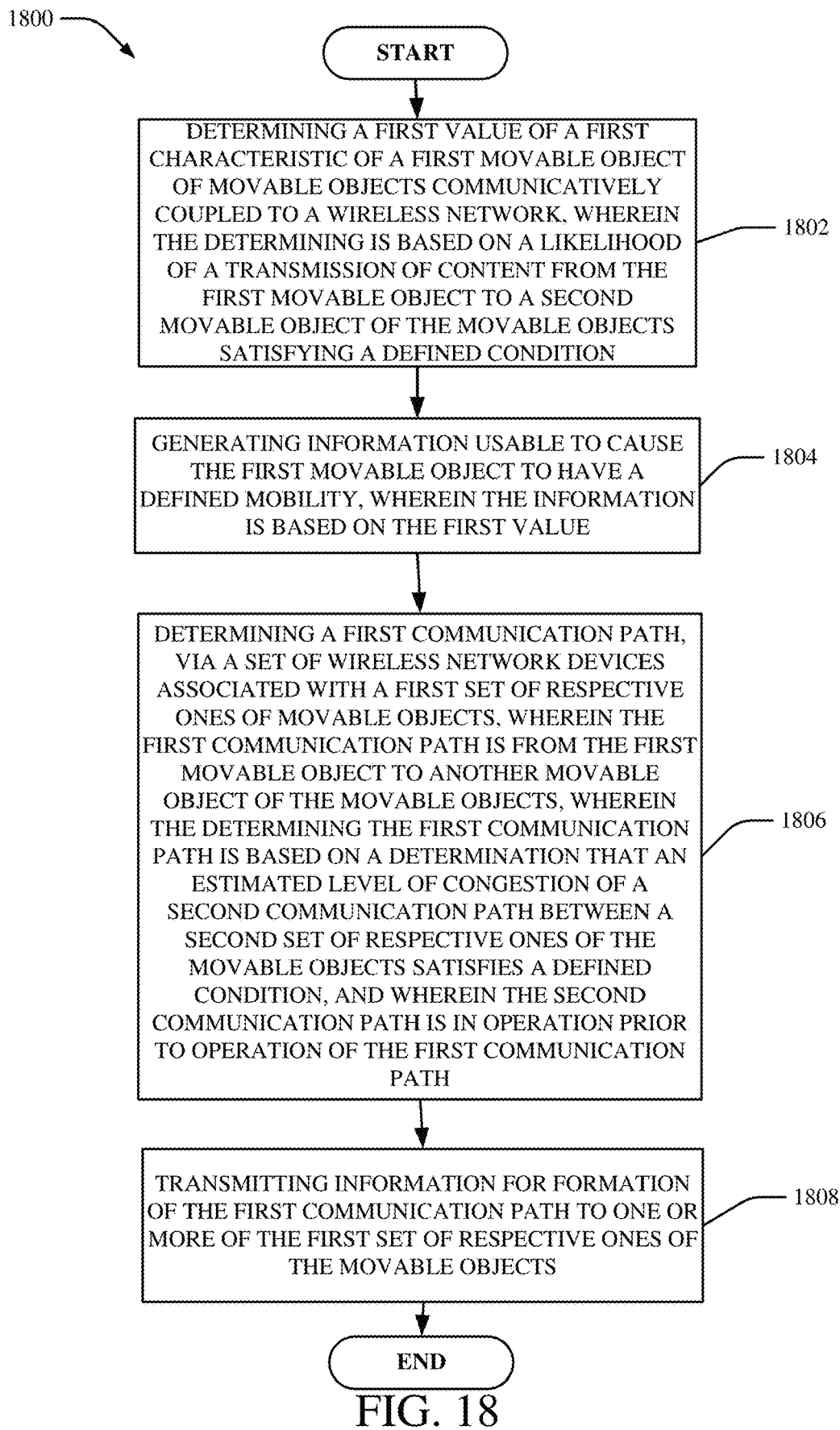

Turning now to FIG. 18, at 1802, method 1800 can include determining a first value of a first characteristic of a first movable object of movable objects communicatively coupled to a wireless network, wherein the determining is based on a likelihood of a transmission of content from the first movable object to a second movable object of the movable objects satisfying a defined condition. At 1804, method 1800 can include generating information usable to cause the first movable object to have a defined mobility, wherein the information is based on the first value.

At 1806, method 1800 can include determining a first communication path, via a set of wireless network devices associated with a first set of respective ones of the movable objects, wherein the first communication path is from the first movable object to another movable object of the movable objects. In some embodiments, determining the first communication path is based on a determination of that an estimated level of congestion of a second communication path between a second set of respective ones of the movable objects satisfies a defined condition. The second communication path is in operation prior to operation of the first communication path.

At 1808, method 1800 can include transmitting information for formation of the first communication path to one or more of the first set of respective ones of the movable objects.

Figure 19:
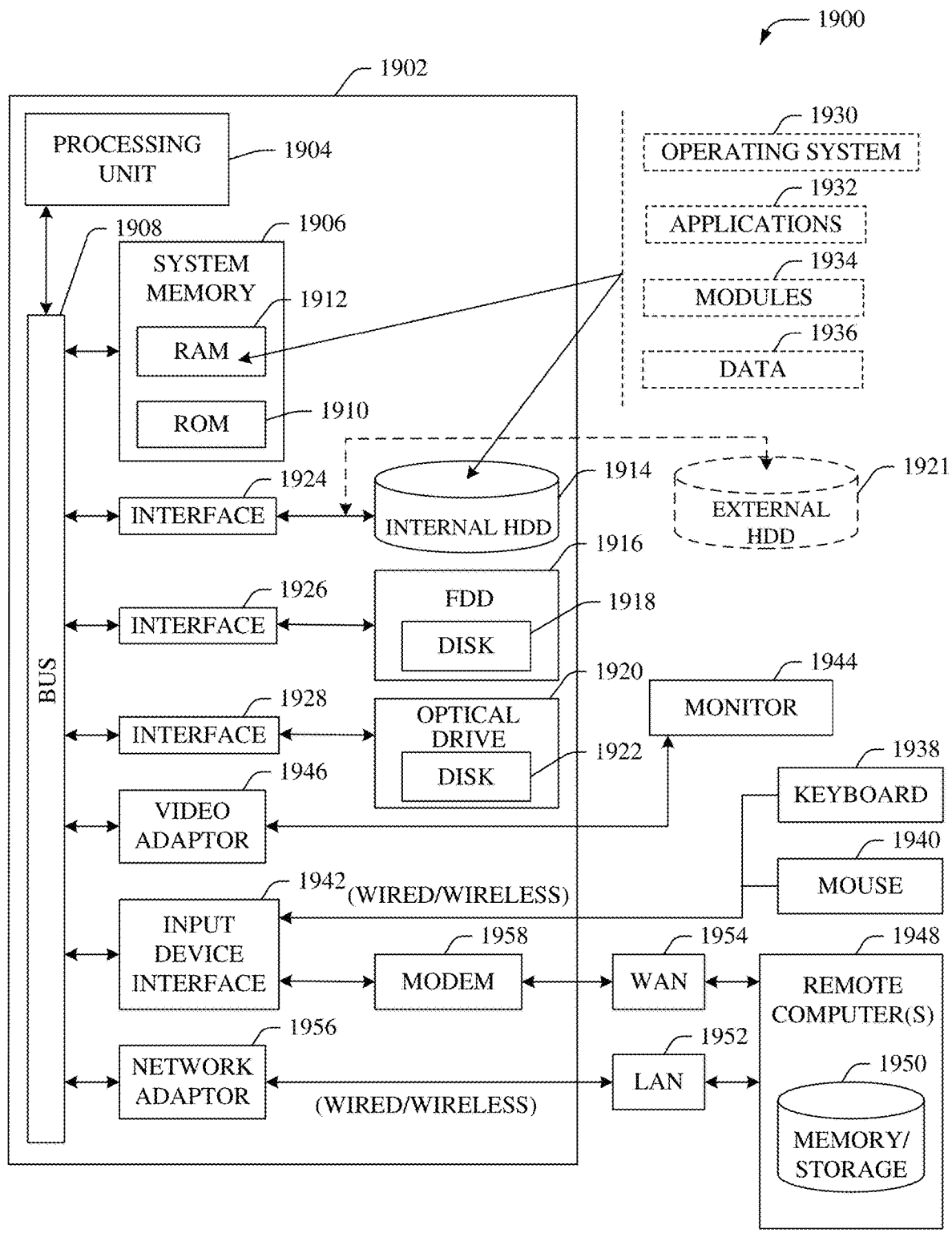
FIG. 19 illustrates a block diagram of a computer operable to facilitate wireless communications via MNs of connected movable objects in accordance with one or more embodiments described herein.

FIG. 19 illustrates a block diagram of a computer operable to facilitate wireless communications via MNs of connected movable objects in accordance with one or more embodiments described herein. For example, in some embodiments, the computer can be or be included within any number of components described herein including, but not limited to, MN device 114, location and movement component 122 and/or MN characteristic component 202 (and/or any components of MN device 114, location and movement component 122 and/or MN characteristic component 202).

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the embodiments described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multiprocessor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1913 (e.g., EIDE, SATA), which internal hard disk drive 1913 can also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface, respectively. The interface 1924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

A mobile device can enter commands and information into the computer 1902 through one or more wired/wireless input devices, e.g., a keyboard 1938 and a pointing device, such as a mouse 1940. Other input devices (not shown) can include a microphone, an infrared (IR) remote control, a joystick, a game pad, a stylus pen, touch screen or the like. These and other input devices are often connected to the processing unit 1904 through an input device interface 1942 that can be coupled to the system bus 1908, but can be connected by other interfaces, such as a parallel port, an IEEE 1394 serial port, a game port, a universal serial bus (USB) port, an IR interface, etc.

A monitor 1944 or other type of display device can be also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1952 through a wired and/or wireless communication network interface or adapter 1956. The adapter 1956 can facilitate wired or wireless communication to the LAN 1952, which can also include a wireless AP disposed thereon for communicating with the wireless adapter 1956.

When used in a WAN networking environment, the computer 1902 can include a modem 1958 or can be connected to a communications server on the WAN 1954 or has other means for establishing communications over the WAN 1954, such as by way of the Internet. The modem 1958, which can be internal or external and a wired or wireless device, can be connected to the system bus 1908 via the input device interface 1942. In a networked environment, program modules depicted relative to the computer 1902 or portions thereof, can be stored in the remote memory/storage device 1950. It will be appreciated that the network connections shown are example and other means of establishing a communications link between the computers can be used.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a device comprising a processor, a distance between a first movable object of movable objects communicatively coupled to a wireless network and a stationary wireless access point device from which a message is received; and
   determining, by the device, a value of a characteristic of the first movable object of movable objects, wherein the determining the value is based on a likelihood of receipt, by a second movable object of the movable objects, of the message being transmitted from the first movable object to the second movable object and the distance between the first movable object and the stationary wireless access point device.

2. The method of claim 1, further comprising:
   generating, by the device, information usable to facilitate moving the first movable object to result in satisfying a defined condition associated with the value.

3. The method of claim 1, further comprising:
   determining, by the device, a communication path via wireless network devices associated with respective ones of the movable objects.

4. The method of claim 3, wherein the communication path is from the first movable object to the second movable object of the movable objects.

5. The method of claim 4, wherein the determining the communication path is based on a result of a determination of a measured power of a signal comprising the message.

6. The method of claim 1, further comprising:
   determining, by the device, a communication path, via wireless network devices associated with respective ones of the movable objects, wherein the communication path is from the first movable object to the second movable object of the movable objects, and wherein the determining the communication path is based on a result of a determination of a defined factor associated with the movable objects.

7. The method of claim 6, wherein information usable to facilitate moving the first movable object comprises strength information indicative of strength of a wireless communication channel between the first movable object and the second movable object.

8. The method of claim 6, wherein the defined factor is a physical arrangement of the movable objects within the wireless network.

9. The method of claim 6, wherein the defined factor is a velocity of the first movable object.

10. The method of claim 6, wherein the defined factor is a specified future velocity of the first movable object.

11. The method of claim 6, wherein the defined factor is a first defined factor, and wherein the determining the communication path is further based on a determination of a second defined factor associated with the movable objects, and wherein the second defined factor comprises a future anticipated environmental constraint for the first movable object.

12. A machine-readable storage medium, comprising executable instructions that, when executed by a processor, facilitate performance of operations, comprising:
    determining a distance between a first movable object of movable objects communicatively coupled to a wireless network and a wireless access point device from which a message is received; and
    determining a value of a characteristic of the first movable object of movable objects, wherein the determining the value is based on a likelihood of receipt, by a second movable object of the movable objects, of the message being transmitted from the first movable object to the second movable object and the distance between the first movable object and the wireless access point device.

13. The machine-readable storage medium of claim 12, wherein the operations further comprise:
    generating information usable to facilitate moving the first movable object to result in satisfying a defined condition associated with the value.

14. The machine-readable storage medium of claim 12, wherein the operations further comprise:
    determining a communication path via wireless network devices associated with respective ones of the movable objects.

15. The machine-readable storage medium of claim 14, wherein the communication path is from the first movable object to the second movable object of the movable objects.

16. The machine-readable storage medium of claim 15, wherein the determining the communication path is based on a result of a determination of a measured power of a signal comprising the message.

17. A system, comprising:
    a processor; and
    a memory that stores executable instructions that, when executed by the processor, facilitate performance of operations, comprising:
        determining a distance between a first movable object of movable objects communicatively coupled to a wireless network and a stationary wireless access point device from which a message is received; and
        employing the distance to determine a value of a characteristic of the first movable object of movable objects, wherein the determining the value is further based on a likelihood of receipt, by a second movable object of the movable objects, of the message being transmitted from the first movable object to the second movable object.

18. The system of claim 17, wherein the operations further comprise:
    determining a communication path via wireless network devices associated with respective ones of the movable objects, wherein the communication path is from the first movable object to the second movable object of the movable objects, and wherein the determining the communication path is based on a result of a determination of a defined factor associated with the movable objects.

19. The system of claim 18, wherein information usable to facilitate moving the first movable object comprises strength information indicative of strength of a wireless communication channel between the first movable object and the second movable object.

20. The system of claim 17, wherein the determining the communication path is based on a result of a determination of a measured power of a signal comprising the message.

* * * * *